(12) United States Patent
Tojima

(10) Patent No.: US 7,843,487 B2
(45) Date of Patent: Nov. 30, 2010

(54) SYSTEM OF LINKABLE CAMERAS, EACH RECEIVING, CONTRIBUTING TO THE ENCODING OF, AND TRANSMITTING AN IMAGE

(75) Inventor: Masayoshi Tojima, Fukuoka (JP)

(73) Assignee: Panasonic Corporation, Osaka (JP)

( * ) Notice: Subject to any disclaimer, the term of this patent is extended or adjusted under 35 U.S.C. 154(b) by 618 days.

(21) Appl. No.: 11/892,852

(22) Filed: Aug. 28, 2007

(65) Prior Publication Data

US 2008/0049116 A1 Feb. 28, 2008

(30) Foreign Application Priority Data

Aug. 28, 2006 (JP) .............................. 2006-230058

(51) Int. Cl.
*H04N 7/00* (2006.01)
*H04N 13/00* (2006.01)
*H04N 13/02* (2006.01)
*H04N 5/228* (2006.01)
*H04N 5/76* (2006.01)
*A61B 1/04* (2006.01)
*G03B 35/00* (2006.01)
*G06F 3/00* (2006.01)

(52) U.S. Cl. ........................... 348/36; 348/159; 348/42; 348/46; 348/222.1; 348/231.6; 348/231.99; 396/324; 396/325; 715/748; 715/751

(58) Field of Classification Search ................... 348/14, 348/211, 239
See application file for complete search history.

(56) References Cited

U.S. PATENT DOCUMENTS

| | | | | |
|---|---|---|---|---|
| 5,481,297 A | * | 1/1996 | Cash et al. ............... | 348/14.12 |
| 6,188,431 B1 | * | 2/2001 | Oie ......................... | 348/211.5 |
| 6,549,650 B1 | * | 4/2003 | Ishikawa et al. ............ | 382/154 |
| 6,864,911 B1 | * | 3/2005 | Zhang et al. .................. | 348/42 |
| 7,733,371 B1 | * | 6/2010 | Monroe ....................... | 348/153 |
| 2005/0008240 A1 | * | 1/2005 | Banerji et al. ............... | 382/238 |
| 2005/0141607 A1 | * | 6/2005 | Kaplinsky ................ | 375/240.2 |
| 2005/0185047 A1 | * | 8/2005 | Hii .............................. | 348/36 |
| 2005/0190263 A1 | | 9/2005 | Monroe et al. | |
| 2006/0056056 A1 | * | 3/2006 | Ahiska et al. ............... | 359/690 |
| 2006/0174204 A1 | * | 8/2006 | Jung et al. .................. | 715/751 |

(Continued)

FOREIGN PATENT DOCUMENTS

JP 9-224180 8/1997

(Continued)

*Primary Examiner*—Lin Ye
*Assistant Examiner*—Chia-Wei A Chen
(74) *Attorney, Agent, or Firm*—Wenderoth, Lind & Ponack, L.L.P.

(57) ABSTRACT

The camera system of the present invention includes a plurality of cameras each including an imaging unit and an image processing unit. If configured to operate in a mode that is for cooperation with other cameras, a first camera included in the camera system causes the image processing unit thereof to receive images from other cameras, and generate synthesized image by synthesizing the received images and an image captured by the imaging unit thereof. The first camera transmits the generated synthesized image to a second camera included in the camera system. The second camera causes, if configured to operate in the mode that is for cooperation with other cameras, the image processing unit thereof to perform part or whole of encoding of the received synthesized image.

12 Claims, 18 Drawing Sheets

U.S. PATENT DOCUMENTS

2006/0174205 A1* 8/2006 Jung et al. .................. 715/751
2006/0174206 A1* 8/2006 Jung et al. .................. 715/751
2006/0181612 A1* 8/2006 Lee et al. ................. 348/207.1
2006/0187227 A1* 8/2006 Jung et al. .................. 345/536

FOREIGN PATENT DOCUMENTS

JP          2004-135209          4/2004

* cited by examiner

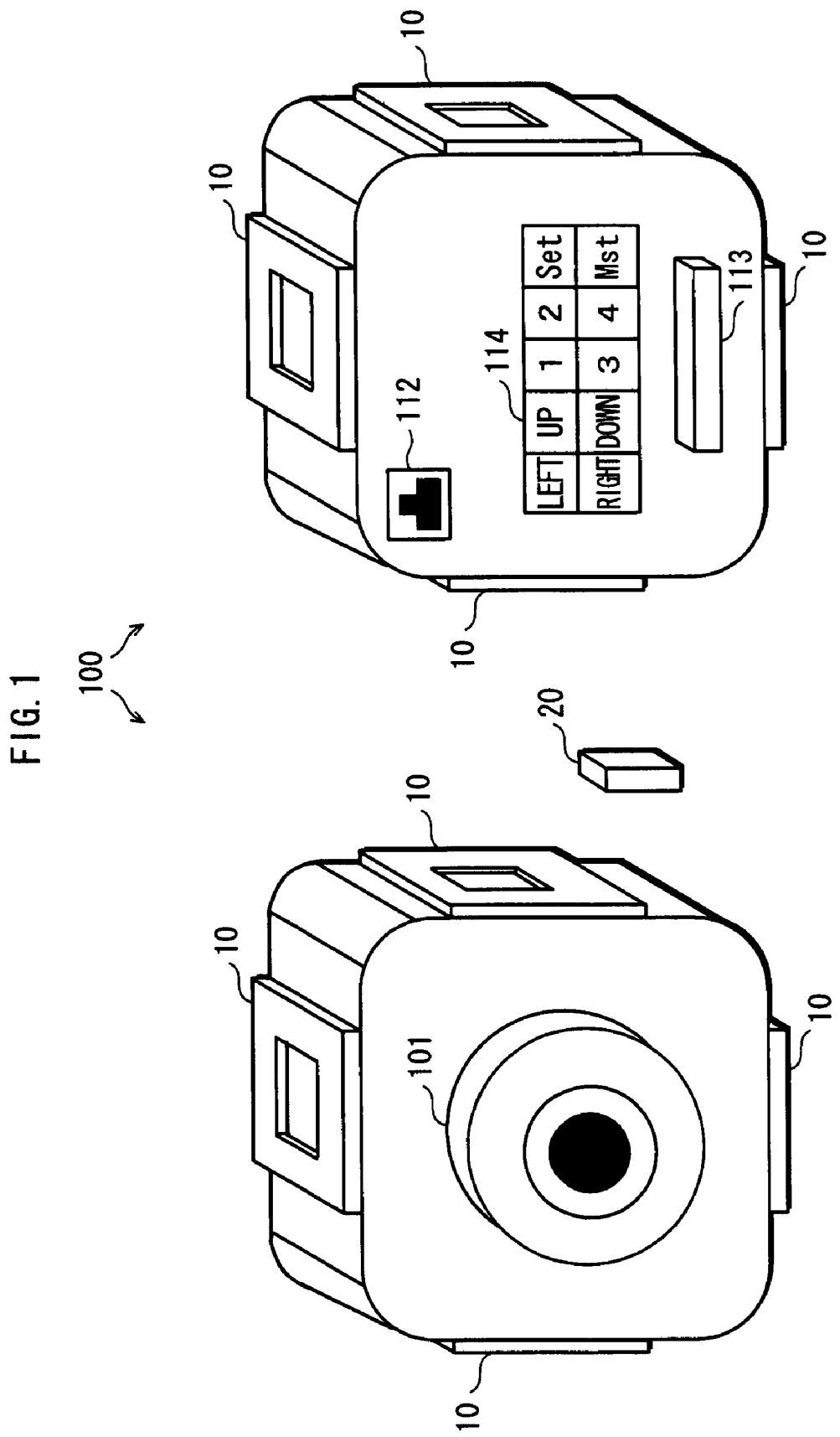

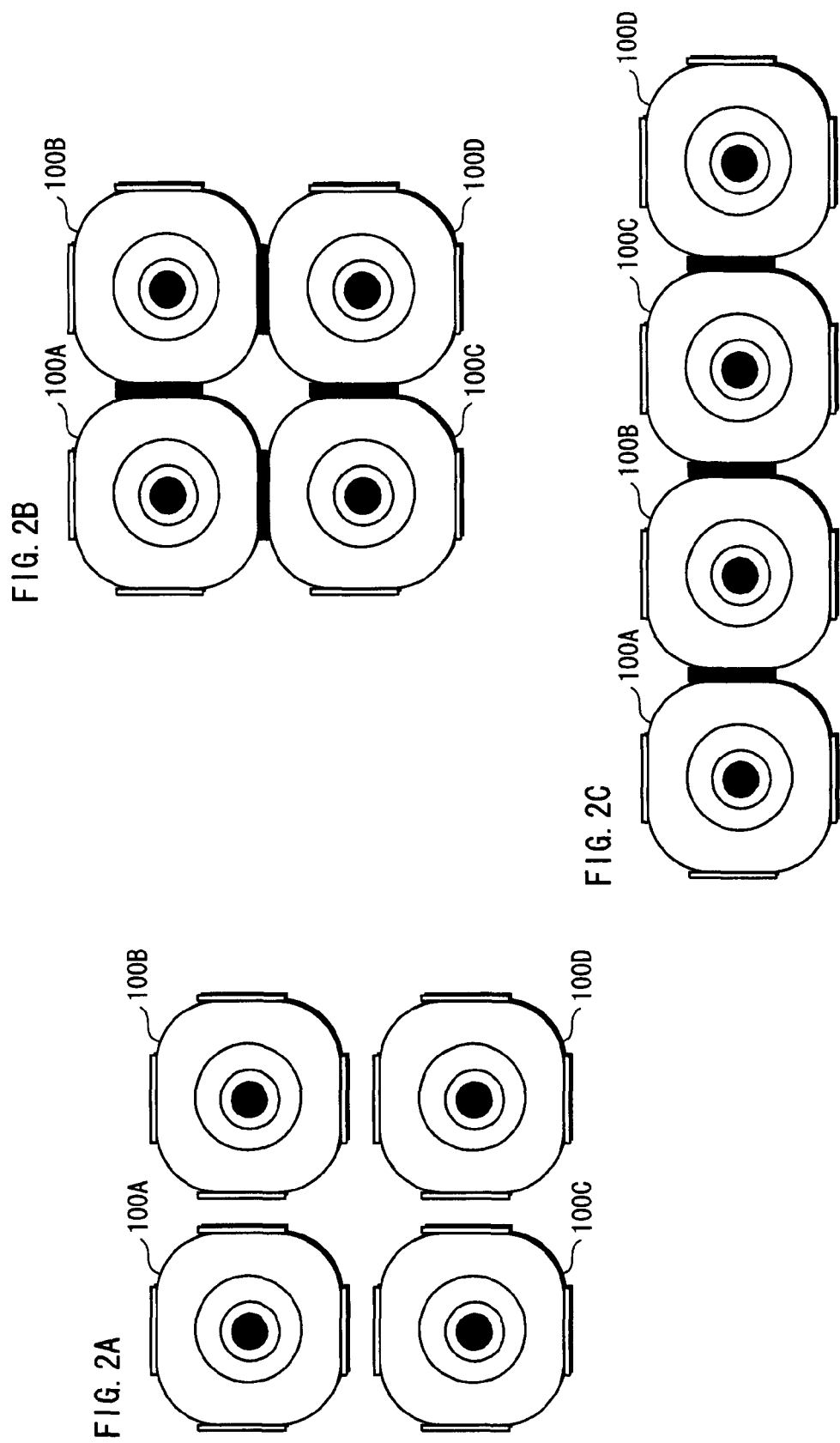

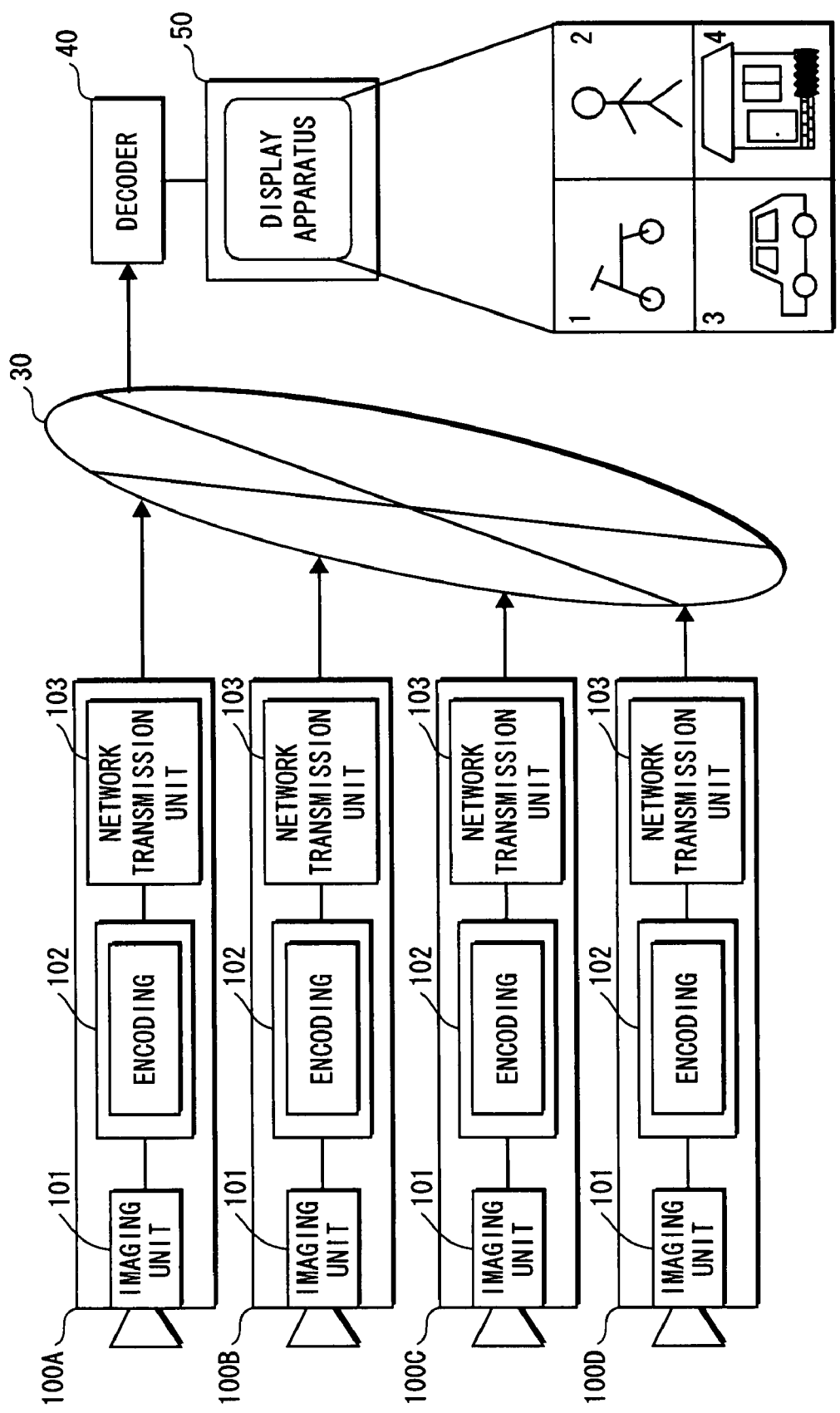

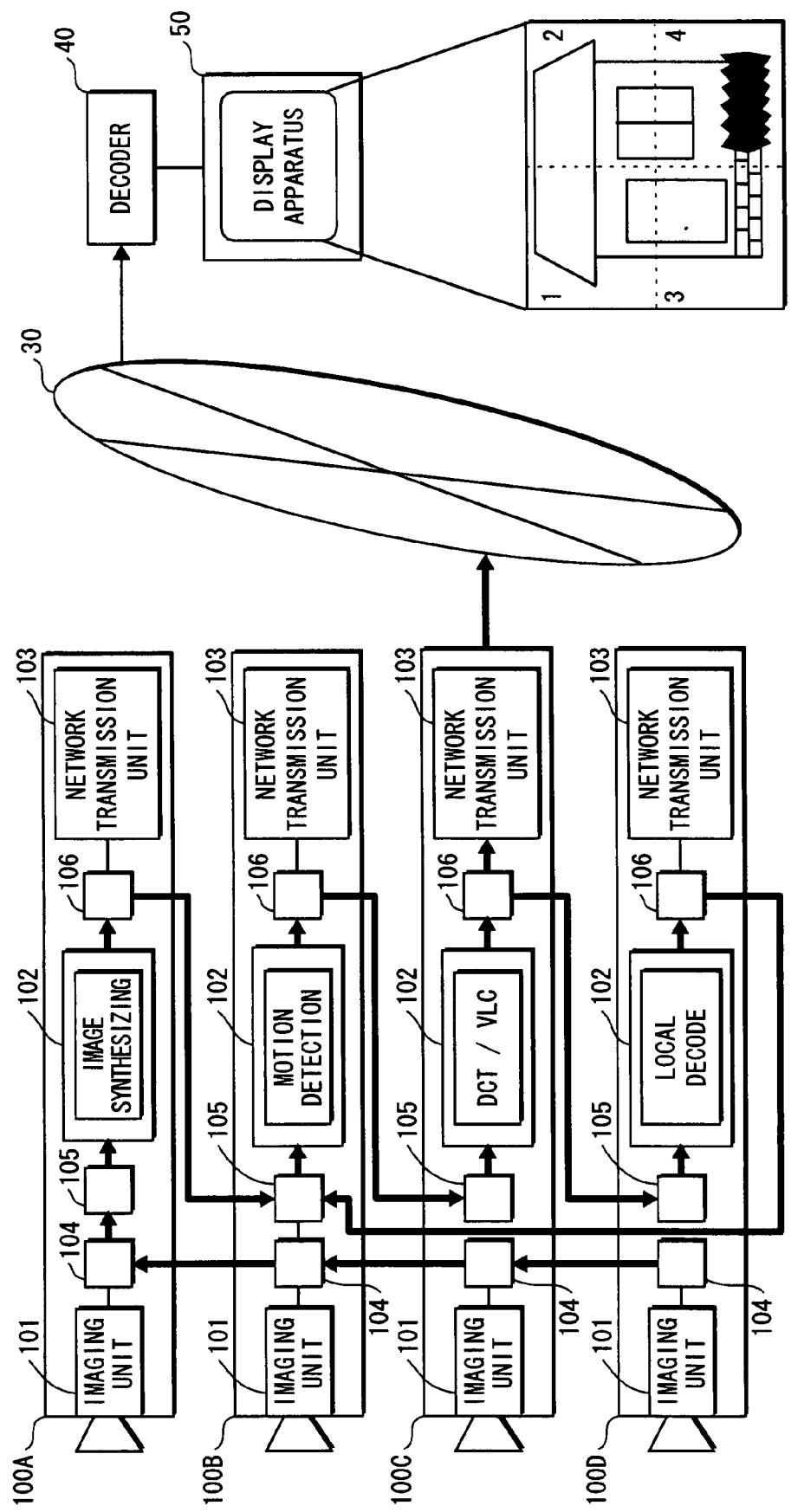

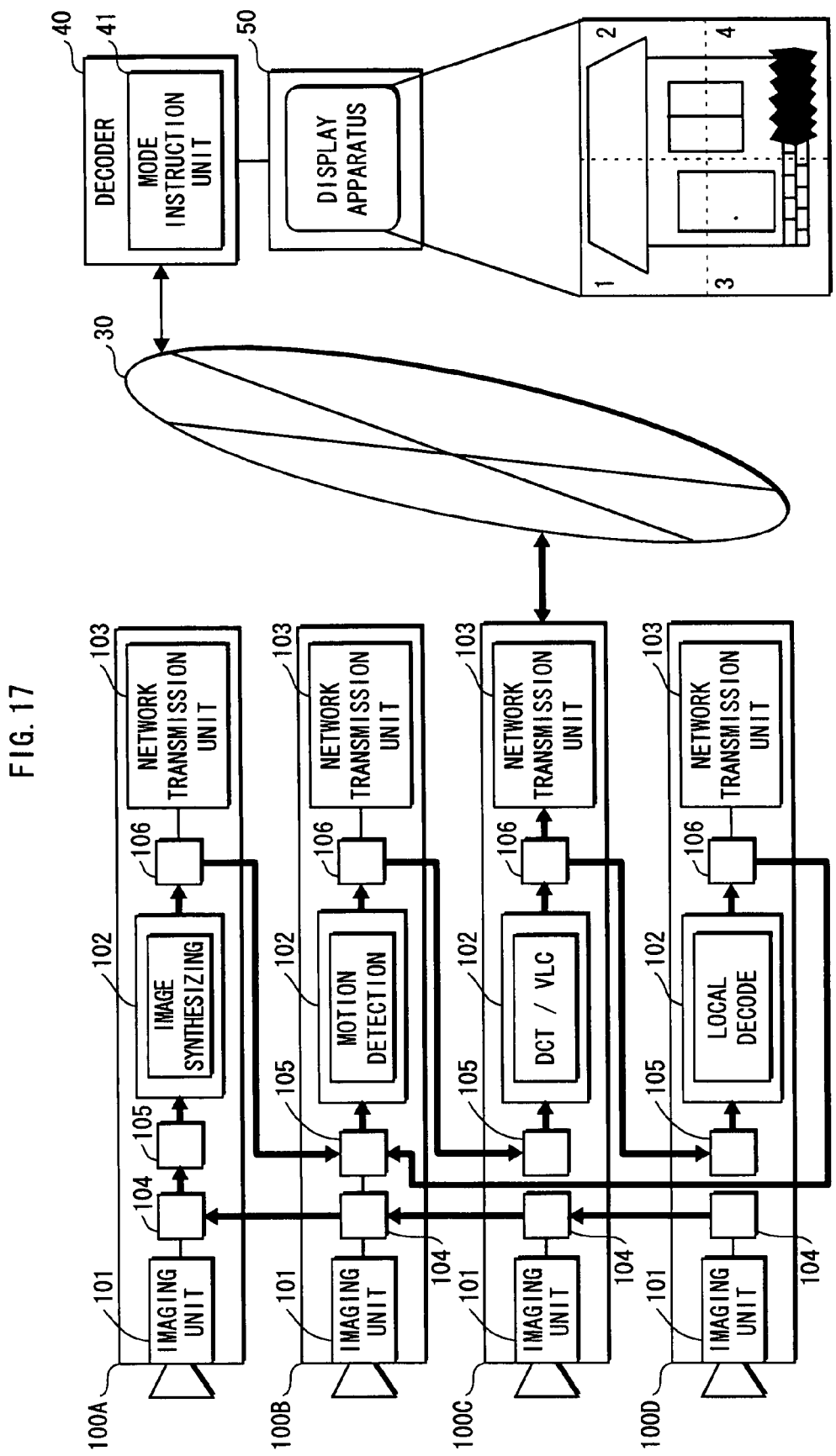

SYSTEM OF LINKABLE CAMERAS, EACH RECEIVING, CONTRIBUTING TO THE ENCODING OF, AND TRANSMITTING AN IMAGE

BACKGROUND OF THE INVENTION (1) Field of the Invention

The present invention relates to a camera having a function to encode and output captured images, a camera system using the same, and an image processing circuit used in the same.

(2) Description of the Related Art

Some conventional cameras have a function to encode captured images and output the encoded images to an external network.

Such cameras are used as surveillance cameras, for example. A receiver connected to a network receives images captured by the cameras, and outputs the images to a display such that an operator can monitor the images.

Meanwhile, a capability to capture images at a high resolution and a capability to capture wide images called panoramic images are demanded of such cameras.

For example, to meet the demand for high resolution, a prior art suggests a technique to capture an image of an object with a camera equipped with a plurality of image sensors each capturing a segment of the image of the object, and synthesize the segment images.

For example, FIG. 1 illustrates the structure of a camera disclosed in Japanese Laid-open Patent Application Publication No. 9-224180 that is aimed at realizing high resolution.

The camera disclosed in this publication is equipped with imaging lenses 1001a to 1001d and CCDs 1002a to 1002d for capturing divided images of the object. The images captured by the CCDs 1002a to 1002d are respectively subjected to preprocessing (e.g. white balance and gamma correction) performed by preprocessing circuits 1003a to 1003d, and to distortion correction performed by distortion correction circuits 1004a to 1004d. A synthesizing circuit 1006 synthesizes the images respectively distortion-corrected by the distortion correction circuits 1004a to 1004d.

With this structure, the camera is capable of synthesizing the segment images to obtain a high-resolution image.

However, if a camera is equipped with a plurality of image sensors, it is difficult to realize high resolution with flexibility and scalability.

In other words, even if a camera is equipped with four image sensors each offering one mega pixels, and is capable of capturing images of four mega pixels, it is impossible for the camera to capture images with higher resolution, such as images of 8 mega pixels and images of 10 mega pixels.

To obtain images with higher resolution, it is necessary to manufacture a camera equipped with a larger number of image sensors.

Also, if a camera is equipped with four image sensors arranged in a row each offering 0.1 mega×0.1 mega pixels to obtain panoramic images of 0.4 mega×0.1 mega pixels, the camera can capture only panoramic images, and it is impossible for the camera to obtain images of general sizes.

In terms of the problems above, the present invention aims to provide a camera system that fulfills the demand for high resolution and has high scalability.

SUMMARY OF THE INVENTION

To solve the problems above, the present invention provides a camera system that includes a plurality of cameras including at least a first camera and a second camera, each of the plurality of cameras comprising: an imaging unit; and an image processing unit operable, if configured to operate in a first mode that is for stand-alone operation, to perform encoding processing on an image captured by the imaging unit, the first camera further comprising: an image receiving unit operable to receive images from other cameras among the plurality of cameras; a first execution unit operable, if configured to operate in a second mode that is for cooperation with said other cameras, to cause the image processing unit of the first camera to generate a synthesized image by synthesizing the images received by the image receiving unit and an image captured by the imaging unit of the first camera; and a synthesized image transmission unit operable to transmit the synthesized image to the second camera, and the second camera further comprising: a synthesized image receiving unit operable to receive the synthesized image from the first camera; and a second execution unit operable, if configured to operate in the second mode, to cause the image processing unit of the second camera to perform part or whole of the encoding processing on the synthesized image received by the synthesized image receiving unit.

To solve the problems above, the present invention also provides a camera that is capable of cooperating with a plurality of other cameras, comprising: an imaging unit; an image processing unit operable, if configured to operate in a first mode that is for stand-alone operation, to perform encoding processing on an image captured by the imaging unit; an image receiving unit operable, if configured to operate in a second mode that is for cooperation with other cameras, to receive images from said other cameras; an execution unit operable, if configured to operate in the second mode, to cause the image processing unit to generate a synthesized image by synthesizing the images received by the image receiving unit and an image captured by the imaging unit; and a transmission unit operable to transmit the generated synthesized image and an instruction for performing the encoding processing on the synthesized image to at least one of said other cameras.

To solve the problems above, the present invention also provides a camera that is capable of cooperating with a plurality of other cameras, comprising: an imaging unit; an image processing unit operable, if configured to operate in a first mode that is for stand-alone operation, to perform encoding processing on an image captured by the imaging unit; an image transmission unit operable, if configured to operate in a second mode that is for cooperation with other cameras, to transmit an image captured by the imaging unit to one of the plurality of other cameras; and a synthesized image receiving unit operable, if configured to operate in the second mode, to receive, from the first camera, a synthesized image generated by synthesizing the image captured by the imaging unit and other images; and an execution unit operable, if configured to operate in the second mode, to cause the image processing unit to perform part or whole of the encoding processing on the synthesized image received by the synthesized image receiving unit.

To solve the problems above, the present invention also provides an image processing circuit that is usable in a camera and capable of cooperating with other image processing circuits, the image processing circuit comprising: an image processing unit operable, if configured to operate in a first mode that is for stand-alone operation, to perform encoding processing on an image captured by an imaging unit of a camera; an image receiving unit operable, if configured to operate in a second mode that is for cooperation with said other image processing circuits, to receive images from said other image processing circuits; an execution unit operable, if configured to operate in the second mode, to cause the image processing unit of the camera to generate a synthesized image by synthesizing the images received by the image receiving unit and an image captured by the imaging unit; and a transmission unit operable to transmit the generated synthesized image and an instruction for performing the encoding processing on the synthesized image to at least one of said other image processing circuits.

To solve the problems above, the present invention also provides an image processing circuit that is usable in a camera and capable of cooperating with a plurality of other image processing circuits, the image processing circuit comprising: an image processing unit operable, if configured to operate in a first mode that is for stand-alone operation, to perform encoding processing on an image captured by an imaging unit of a camera; an image transmission unit operable, if configured to operate in a second mode that is for cooperation with said other image processing circuits, to transmit an image captured by the imaging unit to one of the plurality of other image processing circuits; and a synthesized image receiving unit operable, if configured to operate in the second mode, to receive, from the one of the plurality of other image processing circuits, a synthesized image generated by synthesizing the image captured by the imaging unit and other images; and an execution unit operable, if configured to operate in the second mode, to cause the image processing unit to perform part or whole of the encoding processing on the synthesized image received by the synthesized image receiving unit.

Here, the wording "to generate a synthesized image by synthesizing" means to join the edges of the images without overlapping, or with overlapping only small portions of the edges of the images.

With the stated structure, in cooperation among plurality of cameras that each is capable of functioning as a stand-alone camera, one of the cameras (the first camera) performs the image synthesizing and other cameras (at least the second camera) share the encoding of the synthesized image. As a result, the user can flexibly combine the plurality of cameras in accordance with a required resolution.

In other words, if each camera includes an imaging unit that offers 1 mega pixels, each camera can singly obtain an image of 1 mega pixels, and N cameras (N: an arbitrary natural number) can obtain an image of N×1 mega pixels in cooperation, for the same object.

Therefore, the present invention can provide a camera system with high scalability in accordance with the demand for high resolution.

Here, the image processing unit of the first camera and the image processing unit of the second camera may include the first execution unit and the second execution unit respectively, the first execution unit and the second execution unit may be reconfigurable circuits, each being capable of changing a circuit structure thereof to perform different processing, when configured to operate in the second mode, the first execution unit may change the circuit structure thereof to generate the synthesized image, and when configured to operate in the second mode, the second execution unit may change the circuit structure thereof to perform part or whole of the encoding processing on the synthesized image.

With the stated structure using the reconfigurable circuit such as an FPGA, it is possible to change the processing to be executed by the image processing unit. As a result, the image processing unit for the stand-alone camera is capable of generating the synthesized image and performing part or whole of the processing for encoding the synthesized image. Accordingly, it is unnecessary for the camera to be equipped with a special circuit for generating the synthesized image and encoding the synthesized image. This is effective for reducing the manufacturing cost of the camera and for miniaturizing the camera.

The first camera may further comprise a camera information receiving unit operable, if configured to operate in the second mode, to receive, from each of said other cameras, an identifier thereof and position information that indicates a relative position thereof with respect to the first camera, and if configured to operate in the second mode, the image processing unit of the first camera may generate the synthesized image based on the identifier and the position information of each of said other cameras received by the camera information receiving unit.

With the stated structure, the first camera generates the synthesized image by joining the image captured by the first camera and the images captured by the other cameras in accordance with the relative positions of the other cameras with respect to the position of the first camera. For example, the image captured by the camera on the left of the first camera is joined on the left of the image captured by the first camera, and the image captured by the camera on the right of the first camera is joined on the right of the image captured by the first camera. In such a manner, the first camera grasps the positional relation to precisely perform the image synthesizing. Therefore, no matter how the plurality of cameras are combined, it is possible to precisely perform the image synthesizing based on the positional relation among the cameras.

If configured to operate in the second mode, the second camera may perform part of the encoding processing on the synthesized image, using the image processing unit thereof, and among the plurality of cameras, one or more cameras different from the first and the second cameras may share the rest of the encoding processing to be performed on the synthesized image.

With the stated structure, two or more cameras share the encoding processing. Therefore, it is possible to reduce the load on each camera that performs the encoding. In particular, this is useful in the case where a large number of cameras cooperate, because the image quality of the synthesized image is high and the data amount is large in such a case.

If configured to operate in the second mode, the first camera may instruct said other cameras to share the encoding processing to be performed on the synthesized image, and if configured to operate in the second mode, the second camera and said one or more cameras different from the first and the second cameras may share the encoding processing to be performed on the synthesized image.

With the stated structure, the first camera as the master camera instructs the other cameras (at least the second camera) as the slave cameras to share the encoding of the synthesized image. Therefore, it is possible for the first camera to arrange the sharing by the cameras based on several conditions such as the number of the other cameras.

The encoding processing performed on the synthesized image may include a plurality of processing procedures, and if configured to operate in the second mode, the second camera and said one or more cameras different from the first and the second cameras may share the plurality of processing procedures, using the image processing unit of each.

With the stated structure, the cameras that perform the encoding of the synthesized image (the second camera and the other cameras) can share the encoding processing in units of procedures of the encoding processing. Therefore, the cameras can share the procedures of the motion detection, the DCT/Q processing, the VLC processing and the local decode processing, for example.

The synthesized image may be encodable in units of slices in conformity with the MPEG standard, and if configured to operate in the second mode, the second camera and said one or more cameras different from the first and the second cameras may share the slices to perform the encoding processing, using the image processing unit of each.

With the stated structure, the cameras that perform the encoding of the synthesized image (the second camera and the other cameras) can share the encoding processing in units of the slices of the synthesized image.

The camera system may further include an external apparatus connected to the plurality of cameras via a network, and the external apparatus may comprise an instruction unit operable to give an instruction to each of the plurality of cameras to operate in the first mode or the second mode, wherein each of the plurality of cameras may determine which mode to operate in between the first mode and the second mode in accordance with the instruction given by the external apparatus.

With the stated structure, each camera is capable of switching the modes in accordance with the instruction from the external apparatus. Accordingly, in the case where the external apparatus is a monitoring apparatus for monitoring images captured by the cameras for example, a surveillance agent can switch the modes depending on the image to be monitored.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the Drawings:

FIG. 1 is a perspective view showing an appearance of a camera 100;

FIGS. 2A, 2B, and 2C show a plurality of cameras 100 combined together;

FIG. 6 shows a case where the camera 100 operates singly;

FIG. 7 shows a case where a plurality of the cameras 100 are combined together and cooperate;

FIG. 17 shows a camera 100 of a modification example 5; and

DESCRIPTION OF THE PREFERRED EMBODIMENT

Figure 3B:
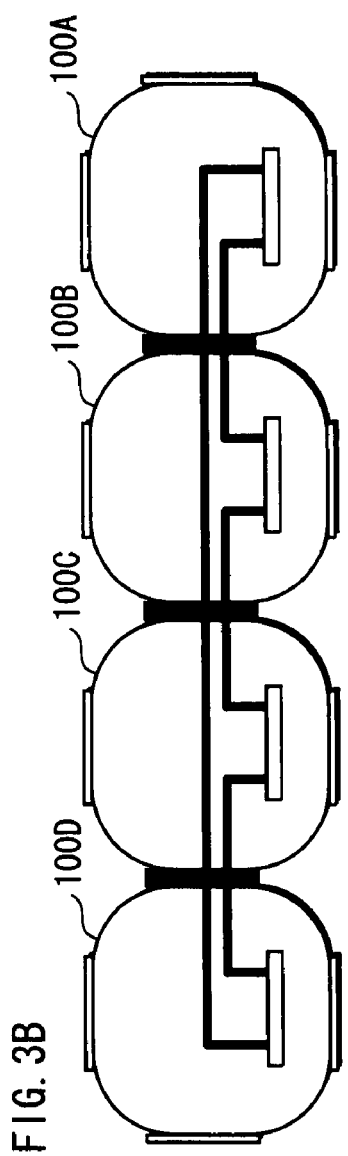
FIGS. 3A and 3B show connections among the cameras 100.

The following describes a preferred embodiment of the present invention with reference to the drawings.

Embodiment 1

Firstly, the following describes a camera 100 pertaining to the embodiment 1.

1. Overview

The camera 100 includes an imaging unit with resolution of 0.1 mega×0.1 mega pixels (total: 1 mega pixels) for example and an image processing unit that encodes images captured by the imaging unit in conformity with the MPEG standard. The camera 100 is for use as a surveillance camera, for example.

When used as a stand-alone camera, the camera 100 has a function to externally transmit a one-mega-pixel image captured and encoded by the imaging unit.

Also, if combined together, a plurality of the cameras 100 have a function to generate images at higher resolution by synthesizing one-mega-pixel images captured by each of the cameras 100 with the imaging unit, and cooperate to encode and externally transmit the synthesized image.

2. Structure

FIG. 1 is a perspective view showing an appearance of the camera 100.

As FIG. 1 illustrates, the camera 100 has a rectangular housing, and has, on the front of the housing, an imaging unit 101 with resolution of 0.1 mega×0.1 mega pixels.

On each of the top, the bottom, the right and the left sides of the housing, a connector 10 is provided for connecting a plurality of the cameras 100.

A depression is provided in the connector 10. It is possible to connect the cameras 100 with each other by connecting the connectors 10 with a connection member 20 fit into the depressions.

Further, the camera 100 has, on the back side of the housing, a network port 112, a data I/O port 113 and an operation unit 114.

The imaging unit 101, the network port 112, the data I/O port 113 and the operation unit 114 are described later in detail.

The following explains the structure where a plurality of the cameras 100 are combined together.

FIGS. 2A, 2B, and 2C show a plurality of the cameras 100 combined together.

In FIGS. 2A to 2C, each of cameras 100A to 100D has the same structure as the structure of the camera 100. In the following explanations, a plurality of the cameras are referred to with attaching an alphabet (e.g. a camera 100A, a camera 100B, a camera 100C, a camera 100D . . . ) for identification.

As FIG. 2A illustrates, the cameras 100A to 100D are connectable with each other via the connector 10.

FIG. 2B illustrates an example case where, as viewed from a user, the camera 100B is connected on the left side of the camera 100A, the camera 100C is connected on the bottom side of the camera 100A, and the camera 100D is connected on the bottom side of the camera 100B (on the left side of the camera 100C).

With such connections, the cameras 100A to 100D cooperate to generate a synthesized image of 0.2 mega×0.2 mega pixels (total: 4 mega pixels) from segment images captured by the respective cameras 100A to 100D, and encode the synthesized image. Here, note that the total number of pixels above is an optimum value of the case where the segment images are perfectly joined to each other at the edges of the images without overlapping each other.

FIG. 2C illustrates an example case where the camera 100B is connected on the left side of the camera 100A, the camera 100C is connected on the left side of the camera B, and the camera 100D is connected on the left side of the camera 100C.

With such connections, the cameras 100A to 100D cooperate to generate a synthesized image of 0.4 mega×0.1 mega pixels (total: 4 mega pixels) from segment images captured by the respective cameras 100A to 100D, and encode the synthesized image. This structure is suitable for capturing panoramic images.

To combine the cameras 100A to 100D, the cameras 100A to 100D are to be connected via the data I/O ports 113 thereof to transmit/receive data to/from each other.

The connection via the data I/O ports 113 is realized by wiring with use of FPCs (Flexible Printed Circuits), cables, or the like.

Figure 3A:
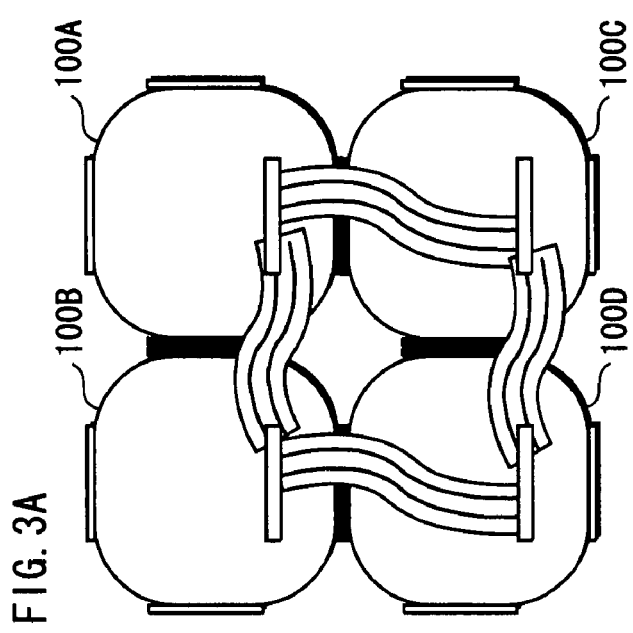

FIGS. 3A and 3B show connections among the cameras 100.

Note that the network port 112 and the operation unit 114, provided on the rear side of each camera 100, are not illustrated.

FIG. 3A shows an example of connections among the cameras 100A to 100D connected as FIG. 2B shows.

As FIG. 3A shows, the output terminal of the data I/O port 113 of the camera 100A is connected to the input terminal of the data I/O port 113 of the camera 100C via an FPC, for example. The output terminal of the data I/O port 113 of the camera 100C is connected to the input terminal of the data I/O port 113 of the camera 100D via an FPC. The output terminal of the data I/O port 113 of the camera 100D is connected to the input terminal of the data I/O port 113 of the camera 100B via an FPC. The output terminal of the data I/O port 113 of the camera 100B is connected to the input terminal of the data I/O port 113 of the camera 100A via an FPC.

FIG. 3B shows an example of connections among the cameras 100A to 100D connected as FIG. 2C shows.

As FIG. 3B shows, the output terminal of the data I/O port 113 of the camera 100A is connected to the input terminal of the data I/O port 113 of the camera 100B via a cable, for example. The output terminal of the data I/O port 113 of the camera 100B is connected to the input terminal of the data I/O port 113 of the camera 100C via a cable. The output terminal of the data I/O port 113 of the camera 100C is connected to the input terminal of the data I/O port 113 of the camera 100D via a cable. The output terminal of the data I/O port 113 of the camera 100D is connected to the input terminal of the data I/O port 113 of the camera 100A via a cable.

As FIGS. 3A and 3B illustrate, the cameras 100A to 100D are connected to each other to form a chain bus, so that data output from each camera is receivable by any of the cameras 100A to 100D.

As described above, the plurality of the cameras 100 are connectable to each other.

When the plurality of the cameras 100 are connected to each other, any one of the cameras 100 operates as a master camera, and the others operate as slave cameras.

The user presses an "Mst" button on the operation unit 114 of any one of the cameras that is to be configured as the master camera, to configure the camera as the master camera.

For each of the cameras to be configured as the slave cameras, the user presses a character key ("up", "down", "left", or "right") and a numeric key ("1", "2", "3", . . . , or "4") on the operation unit 114 to set a relative position with respect to the master camera.

For example, "left 1" means a position on the immediate left of the master camera, "down 1" means a position immediately below the master camera, and "left 1 down 1" means a position on the immediate left-down side of the master camera.

As a result, among the cameras 100A to 100D, the camera as the maser camera and the cameras as the slave cameras can cooperate.

The following describes the structure of the camera 100 in detail.

Figure 4:
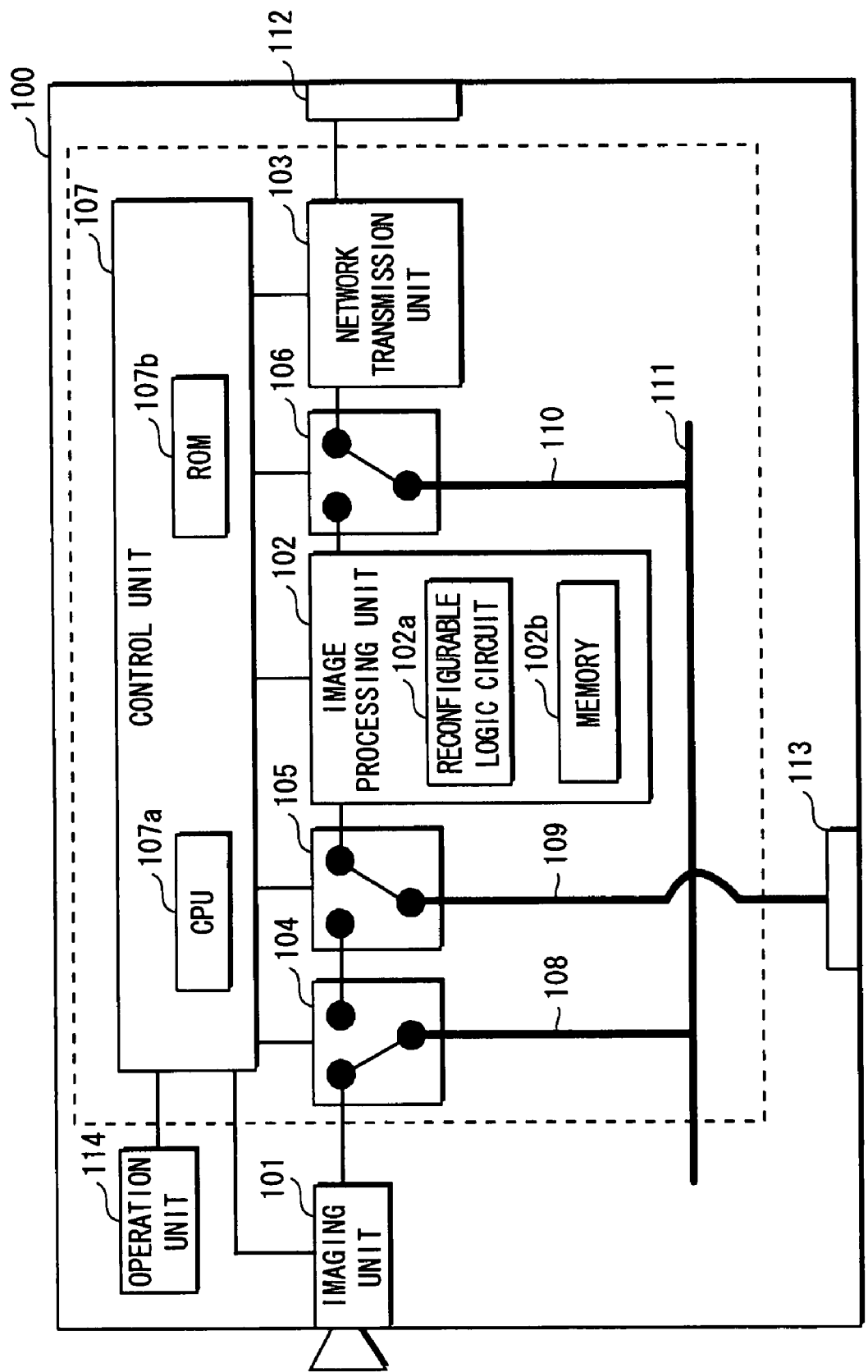
FIG. 4 is a block diagram showing the structure of the camera 100.

FIG. 4 is a block diagram showing the structure of the camera 100.

The camera 100 includes an imaging unit 101, an image processing unit 102, a network transmission unit 103, a camera output data selector 104, an image processing input data selector 105, an image processing output data selector 106, a control unit 107, buses 108, 109 and 110, a bus selector 111, a network port 112, a data I/O port 113, and an operation unit 114.

The imaging unit 101 includes image sensors with resolution of 0.1 mega×0.1 mega pixels (total: 1 mega pixels), and has a function to capture images of the object using the image sensors and to perform part of preprocessing such as the white balance and the gamma correction on the captured images.

The image processing unit 102 has a function to perform image processing on the images captured by the imaging unit 101, and particularly includes a reconfigurable logic circuit 102a and a memory 102b.

The reconfigurable logic circuit 102a is an FPGA (Field Programmable Gate Array), which is an LSI whose circuit structure can be reconfigured by programming. The circuit structure of the reconfigurable logic circuit 102a can be changed by executing a program stored in the memory 102b, to perform various kinds of processing.

The memory 102b is, for example, a RAM (Random Access Memory), and stores programs to be executed by the reconfigurable logic circuit 102a and information required for the execution of the programs. In particular, the memory 102b stores an image synthesizing program and an encoding program as programs to be executed by the reconfigurable logic circuit 102a.

The image synthesizing program has a function to change the circuit structure of the reconfigurable logic circuit 102a such that the reconfigurable logic circuit 102a synthesizes a plurality of input images by joining the images together to generate a synthesized image.

The encoding program has a function to change the circuit structure of the reconfigurable logic circuit 102a such that the reconfigurable logic circuit 102a performs motion detection processing, DCT/Q (Discrete Cosine Transformation/Quantization) processing, VLC (Variable Length Coding) processing, and local decode processing.

The memory 102b can also store, as the information required for the execution of the image synthesizing program, a table including IDs for identifying the other cameras and the positions of the other cameras, which are associated one-to-one.

Note that in this embodiment, it is assumed that an ID of the camera 100A is AAA, an ID of the camera 100B is BBB, an ID of the camera 100C is CCC, and an ID of the camera 100D is DDD.

The network transmission unit 103 has a function to transmit data that has been image-processed by the image processing unit 102 to an external IP network via the network port 112.

The camera output data selector 104 is a switch for selecting whether to input an image captured by the imaging unit 101 into the image processing unit 102, or to input the captured image into the other cameras via the bus 108 and the bus selector 111.

The image processing input data selector 105 is a switch for selecting whether to input an image captured by the imaging unit 101 into the image processing unit 102, or to input data received from the other cameras into the image processing unit 102 via the bus 109.

The image processing output data selector 106 is a switch for selecting whether to output data processed by the image processing unit 102 to the network transmission unit 103, or to output the data to another camera via the bus 110 and the bus selector 111.

The bus selector 111 is a switch that puts the busses 108 and 110 together to a single line that is for selecting one from among the busses 108 and 110.

The network port 112 is an interface between the network transmission unit 103 and the IP network. The network port 112 is, specifically, structured with an Ethernet™ port or a wireless LAN.

The data I/O port 113 is an interface that has an input terminal for inputting data received from the other cameras into the bus 109, and an output terminal for outputting data to the other cameras via the bus selector 111.

The control unit 107 has a function to control the components included in the camera 100. In particular, the control unit 107 includes a CPU (Central Processing Unit) 107a and a ROM (Read Only Memory) 107b.

The CPU 107a is for executing various kinds of processing by executing programs stored in the ROM 107b.

The ROM 107b is a memory that stores programs to be executed by the CPU 107a and information required for the execution of the programs. In particular, the ROM 107b stores an ID inquiry program and an ID response program.

The ROM 107b also stores a self-ID of the camera.

The ID inquiry program has a function to instruct the camera to transmit, to each of the other cameras, a signal for inquiring the IDs thereof via the data I/O port 113.

The ID response program has a function to transmit, on reception of an inquiry from any of the other cameras, the self-ID stored in the ROM 107b via the data I/O port 113.

The operation unit 114 has a function to receive instructions input by the user to operate the camera 100. Specifically, the operation unit 114 receives instructions via a key pad on which characters and numerals are printed as FIG. 1 illustrates.

3. Data

The following describes data to be stored in the memory 102b and the ROM 107b.

Figure 5A:
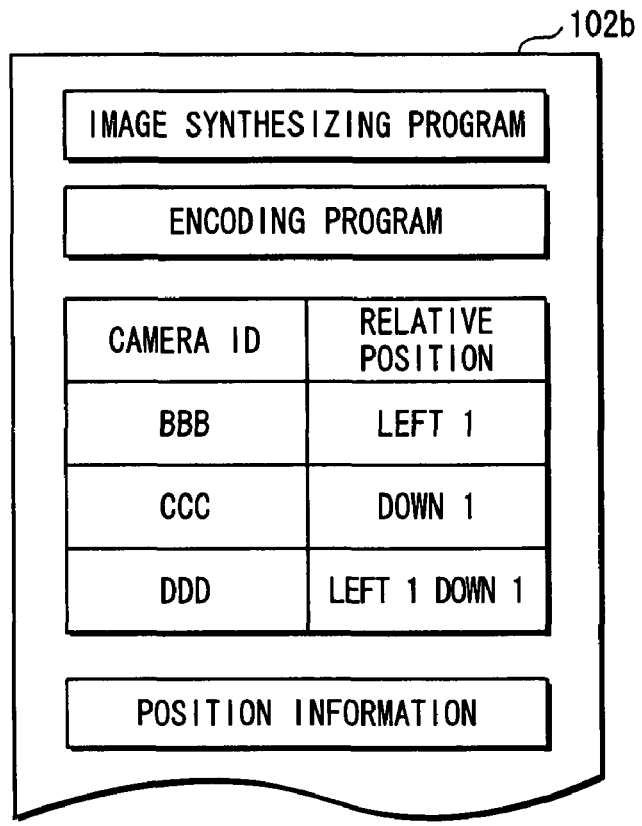
FIGS. 5A and 5B schematically show data to be stored in a memory 102b and data to be stored in a ROM 107b, respectively.

FIG. 5A schematically shows data to be stored in the memory 102b.

The memory 102a stores therein an image synthesizing program, an encoding program, a table, and a position information set.

The image synthesizing program is executed in the case where the camera 100 is configured as the master camera.

The encoding program is executed in the case where the camera 100 operates as a stand-alone camera, in order to encode images captured by the imaging unit 101. The encoding program is also executed in the case where the camera 100 is configured as a slave camera.

The table is generated in the case where the camera 100 is configured as the master camera, by the ID inquiry program associating the IDs of the other cameras connected to the data I/O port 113 of the master camera 100 with relative positions of the cameras with respect to the master camera 100.

The example table illustrated in FIG. 5A is a table stored in the memory 102b of the camera 100A as the master camera, and shows that the camera 100B (ID: BBB) is located on the immediate left side of the camera 100A, the camera 100C (ID: CCC) is located immediately below the camera 100A, and the camera 100D (ID: DDD) is located on the immediately left-down side of the camera 100A.

The position information set indicates the position (relative position) of the camera 100 as the slave camera with respect to the master camera, and is generated by the user's input received from the operation unit 114. In the case where the camera 100 is configured as the master camera, the user inputs "Mst" from the operation unit 114, and on reception of this input, the camera 100 stores information indicating "0" as the position information set.

Figure 5B:
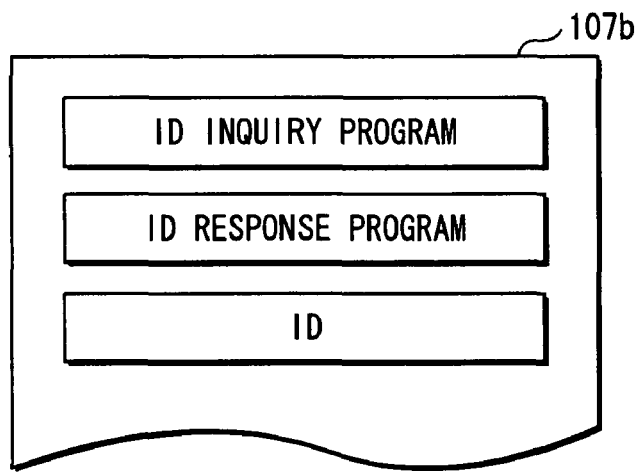

FIG. 5B schematically shows data to be stored in the ROM 107b.

The ROM 107b stores therein an ID inquiry program, an ID response program, and an ID.

The ID inquiry program is executed in the case where the camera 100 is configured as the master camera.

The ID response program is executed in the case where the camera 100 is configured as the slave camera.

The ID is unique identification information for identifying the camera 100.

4. Operations

The following explains operations performed by the camera 100.

4.1 The Case where the Camera is Stand-Alone

FIG. 6 shows the case where the camera 100 operates as a stand-alone camera.

In the case of operating as a stand-alone camera, each of the cameras 100A to 100D externally transmits images captured thereby.

In each of the cameras 100A to 100D, the switches of the camera output data selector 104 and the image processing input data selector 105 are set to input images captured by the imaging unit 101 into the image processing unit 102.

In each of the cameras 100A to 100D, the reconfigurable logic circuit 102a executes the encoding program stored in the memory 102b to configure a circuit that performs encoding. Specifically, the reconfigurable logic circuit 102a configures a hardware engine for performing motion detection, DCT/Q (quantization), VLC, and local decode processing which are required for the image processing, in addition to preprocessing such as noise reduction.

In each of the cameras 100A to 100D, the switch of the image processing output data selector 106 is set to input the images processed by the image processing unit 102 into the network transmission unit 103.

Accordingly, each of the cameras 100A to 100D image-processes images captured by the imaging unit 101 by the image processing unit 102, and transmits the processed images to the IP network 30 via the network transmission unit 103 and the network port 112.

A decoder 40 connected to the IP network 30 receives the captured images transmitted by each of the cameras 100A to 100D, and decodes the images and transmits the decoded images to a display apparatus 50.

The display apparatus 50 divides the screen and display the images captured by the cameras 100A to 100D, received from the decoder 40.

4-2. The Case where Cameras are Combined

FIG. 7 shows the case where a plurality of the cameras 100 are combined together and cooperate.

In FIG. 7, it is assumed that the camera 100A is configured as the master camera, and cameras 100B to 100D are configured as the slave cameras.

In the camera 100A, the switches of the camera output data selector 104 and the image processing input data selector 105 are set to input the captured images received from the data I/O port 113 into the image processing unit 102. Also, the reconfigurable logic circuit 102a of the image processing unit 102 executes the image synthesizing program to configure a circuit that performs the image synthesizing. The switch of the image processing output data selector 106 is set to output the synthesized image generated by the image processing unit 102 from the data I/O port 113.

In the camera 100B, the switch of the camera output data selector 104 is set to output the images captured by the imaging unit 101 from the data I/O port 113. The switch of the image processing input data selector 105 is set to input the synthesized image received from the data I/O port 113 into the image processing unit 102. The reconfigurable logic circuit 102a of the image processing unit 102 executes the encoding program to configure a circuit that performs the motion detection processing, which is part of the encoding processing. The switch of the image processing output data selector 106 is set to output the synthesized image processed by the image processing unit 102 from the data I/O port 113.

In the camera 100C, the switch of the camera output data selector 104 is set to output the images captured by the imaging unit 101 from the data I/O port 113. The switch of the image processing input data selector 105 is set to input the synthesized image received from the data I/O port 113 into the image processing unit 102. The reconfigurable logic circuit 102a of the image processing unit 102 executes the encoding program to configure a circuit that performs the DCT/Q processing and the VLC processing, which is part of the encoding processing. The switch of the image processing output data selector 106 is set to output the synthesized image processed by the image processing unit 102 from the data I/O port 113 or the network transmission unit 103.

In the camera 100D, the switch of the camera output data selector 104 is set to output the images captured by the imaging unit 101 from the data I/O port 113. The switch of the image processing input data selector 105 is set to input the synthesized image received from the data I/O port 113 into the image processing unit 102. The reconfigurable logic circuit 102a of the image processing unit 102 executes the encoding program to configure a circuit that performs the local decode processing, which is part of the encoding processing. The switch of the image processing output data selector 106 is set to output the synthesized image processed by the image processing unit 102 from the data I/O port 113.

Figure 8:
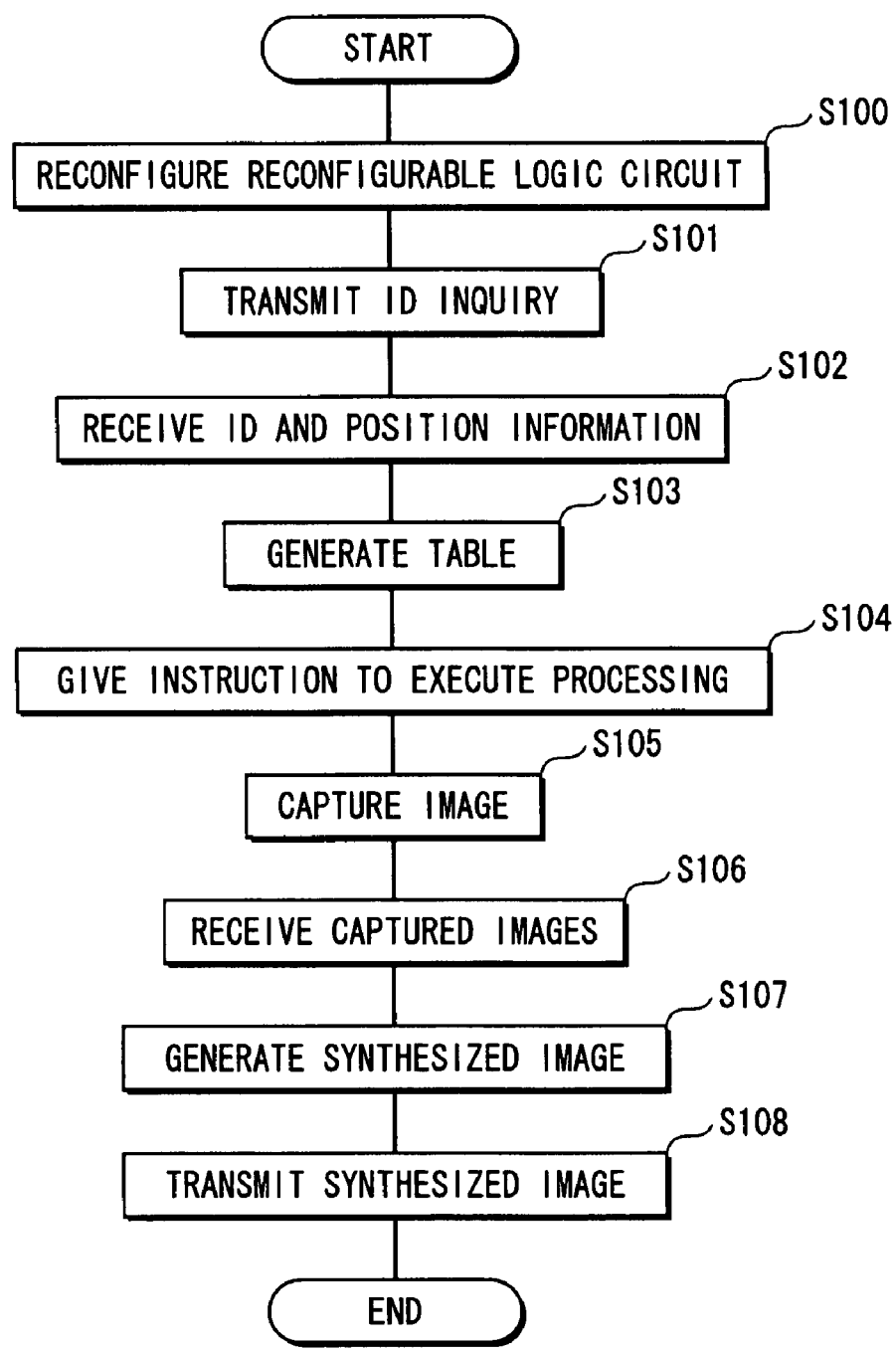
FIG. 8 is a flowchart showing operations of the camera 100 configured as a master camera.
Figure 9:
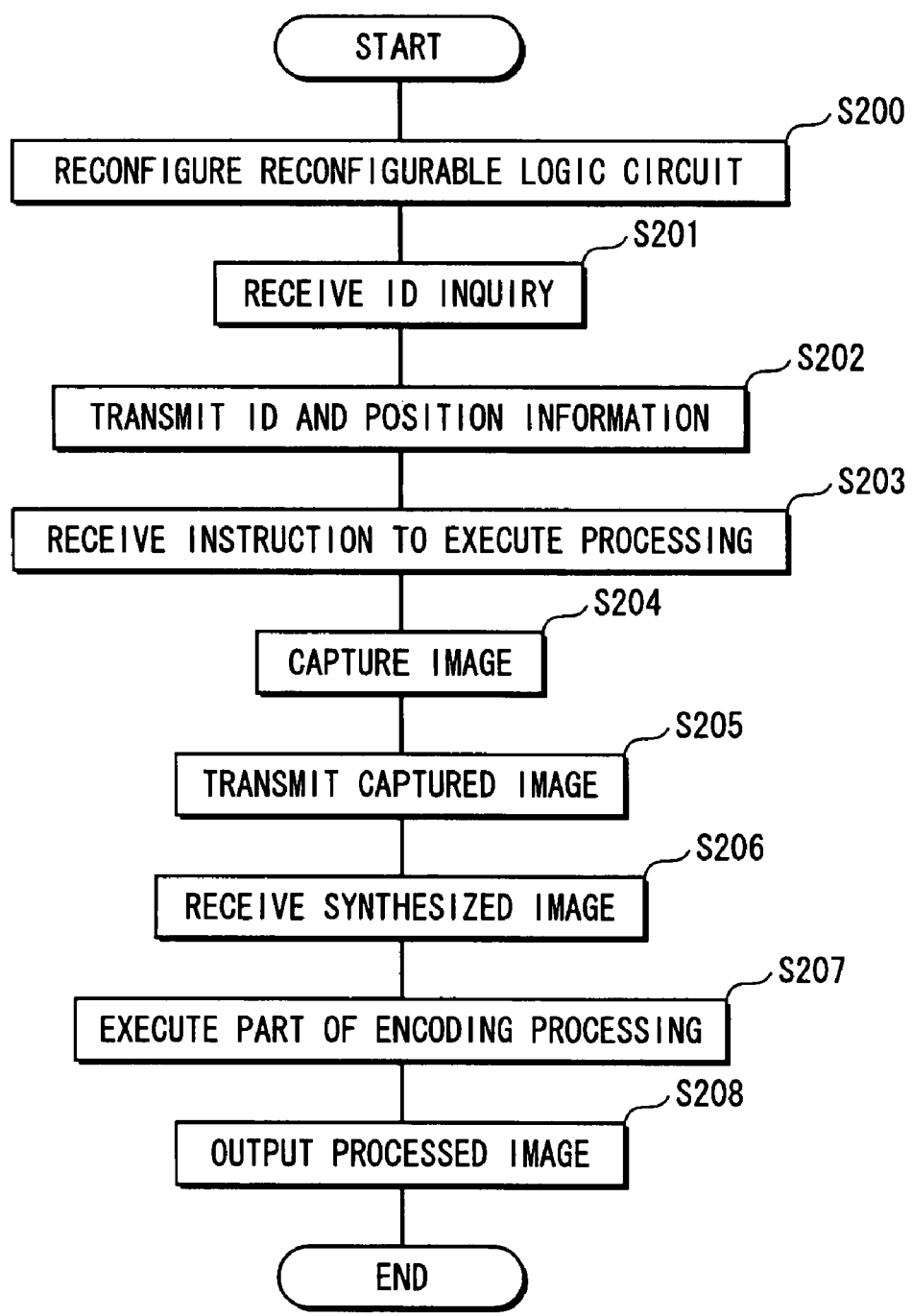
FIG. 9 is a flowchart showing operations of the camera 100 configured as a slave camera.

The following explains these operations in detail with reference to the flowcharts of FIG. 8 and FIG. 9.

FIG. 8 is a flowchart showing operations performed by the camera 100 configured as the master camera.

As FIG. 8 shows, in the camera 100A configured as the master camera, the reconfigurable circuit 102a of the image processing unit 102 executes the image synthesizing program to generate a circuit that performs the image synthesizing (Step S100).

The camera 100A transmits a signal for inquiring IDs of the cameras 100B to 100D via the data I/O port 113 (Step S101).

Upon reception of the IDs and the position information sets from the cameras 100B to 100D (Step S102), the camera 100A generates a table by associating the IDs and the position information sets one-to-one, and stores the table in the memory 102b (Step S103).

The camera 100A refers to the table generated in Step S103, and outputs a signal for giving an instruction to perform the encoding processing to each of the slave cameras 100 via the data I/O port 113, in accordance with the number of the slave cameras 100 (Step S104).

In the example shown in FIGS. 5A and 5B, the number of cameras 100 configured as the slave cameras is 3 (the cameras 100B to 100D). The camera 100A instructs the camera 100B, the camera 100C and the camera 100D to perform the motion detection processing, the DCT/Q processing and the VLC processing, and the local decode processing respectively, which are procedures included in the encoding processing.

The camera 100A captures an image by the imaging unit 101 (Step S105), and also receives images captured by the cameras 100B to 100D, via the data I/O port 113 (Step S106).

The camera 100A joins the image captured in Step S105 and the images received in Step S106 together in accordance with the image synthesizing program, to generate a synthesized image (Step S107).

In Steps S106 and S107, the camera 100A controls the switch of the camera output data selector 104 to input the captured image output from the imaging unit 101 into the image processing unit 102 via the bus 108. Also, the camera 100A controls the switch of the image processing input data selector 105 to select, by the time-division system, the image output from the camera output data selector 104 and the images captured by the cameras 100B to 100D and input via the data I/O port 113, and input the selected images into the image processing unit 102.

In Step S107, the camera 100A temporarily stores the images, which have been captured by the cameras 100B to 100D and input to the image processing unit 102, in the memory 102b, and performs the image synthesizing based on the relation among the relative positions of the images, with reference to the table generated in Step S103. For example, in the case of the example shown in FIGS. 5A and 5B, the image captured by the camera 100B is joined on the left side of the image captured by the camera 100A, and the image captured by the camera 100C is joined on the left-down side of the image captured by the camera 100A, and the image captured by the camera 100D is joined below the image captured by the camera 100A. As a result, a synthesized image of 0.2 mega× 0.2 mega pixels (total: 4 mega pixels) is generated.

Note that a technique to make image correction for preventing image deterioration at the borders of the images is disclosed in the above-mentioned Japanese Laid-open Patent Application Publication No. 1997-224180, for example.

The camera 100A outputs the synthesized image generated in Step S107, via the data I/O port 113 (Step S108).

In Step S108, the camera 100A controls the switch of the image processing output data selector 106 to input the synthesized image output from the image processing unit 102 into the data I/O port 113 via the bus 110.

FIG. 9 is a flowchart showing operations performed by the camera 100 configured as the slave camera.

As FIG. 9 shows, in each of the cameras 100B to 100D configured as the slave cameras, the configurable logic circuit 102a of the image processing unit 102 executes the encoding program to configure a circuit that performs the encoding processing (Step S200).

Upon reception of the signal for inquiring the ID from the camera 100A via the data I/O port 113 (Step S201), each of the cameras 100B to 100D outputs the ID stored in the ROM 107b and the position information set configured by the operation input from the operation unit 114, via the data I/O port 113 (Step S202).

Each of the cameras 100B to 100D receives an instruction indicating a type of the encoding processing to be performed by the camera from the camera 100A (Step S203).

Each of the cameras 100B to 100D captures an image by the imaging unit 101 (Step S204), and also transmits the captured image to the camera 100A via the data I/O port 113 (Step S205).

After that, each of the cameras 100B, to 100D receives a synthesized image from the data I/O data port 113 (Step S206), and performs part of the encoding processing on the received synthesized image in accordance with the instruction received in Step S203 (Step S207), and then outputs the image Via the data I/O port 113 or the network port 112 (Step S208).

The following describes specific operations performed by each of the cameras 100B to 100D in Steps S205 to S208.

(i) The camera 100B controls the switch of the camera output data selector 104 to output the captured image output from the imaging unit 101, to the data I/O port 113 via the bus 108. Also, the camera 100B controls the switch of the image processing input data selector 105 to input the data received via the data input port 113 into the image processing unit 102.

The camera 100B receives the synthesized image that has not been encoded from the camera 100A and the image that has been local-decoded from the camera 100D, and performs the motion detection processing on the synthesized image using the both received images. Then, the camera 100B outputs a difference value and a vector value as results of the motion detection processing to the camera 100C via the data I/O port 113.

The camera 100B controls the switch of the image processing output data selector 106 to outputs the data, output from the image processing unit 102, to the data I/O port 113 via the bus 110.

(ii) The camera 100C controls the switch of the camera output data selector 104 to output the captured image output from the imaging unit 101, to the data I/O port 113 via the bus 108. Also, the camera 100C controls the switch of the image processing input data selector 105 to input the data input via the data input port 113 into the image processing unit 102.

The camera 100C receives the result of the motion detection from the camera 100B, performs the DCT/Q processing, and outputs the resultant data to the camera 100D via the data I/O port 113.

Also, the camera 100C outputs the VLC-processed data to the IP network 30 via the network transmission unit 103.

The camera 100C controls the image processing output data selector 106 to switch between (a) the output of the DCT-processed data, output from the image processing unit 102, to the data I/O port 113, and (b) the output of the VLC-processed data, output from the image processing unit 102, to the network transmission unit 103, by the time-division system.

(iii) The camera 100D controls the switch of the camera output data selector 104 to output the captured image, output from the imaging unit 101, to the data I/O port 113 via the bus 108. Also, the camera 100D controls the switch of the image processing input data selector 105 to input the data received via the data input port 113 into the image processing unit 102.

The camera 100D receives the result of the DCT/Q processing from the camera 100C, performs the local decode processing, and outputs the resultant data to the camera 100B via the data I/O port 113.

The camera 100D controls the switch of the image processing output data selector 106 to output the data output from the image processing unit 102 to the data I/O port 113 via the bus 110.

Figure 10:
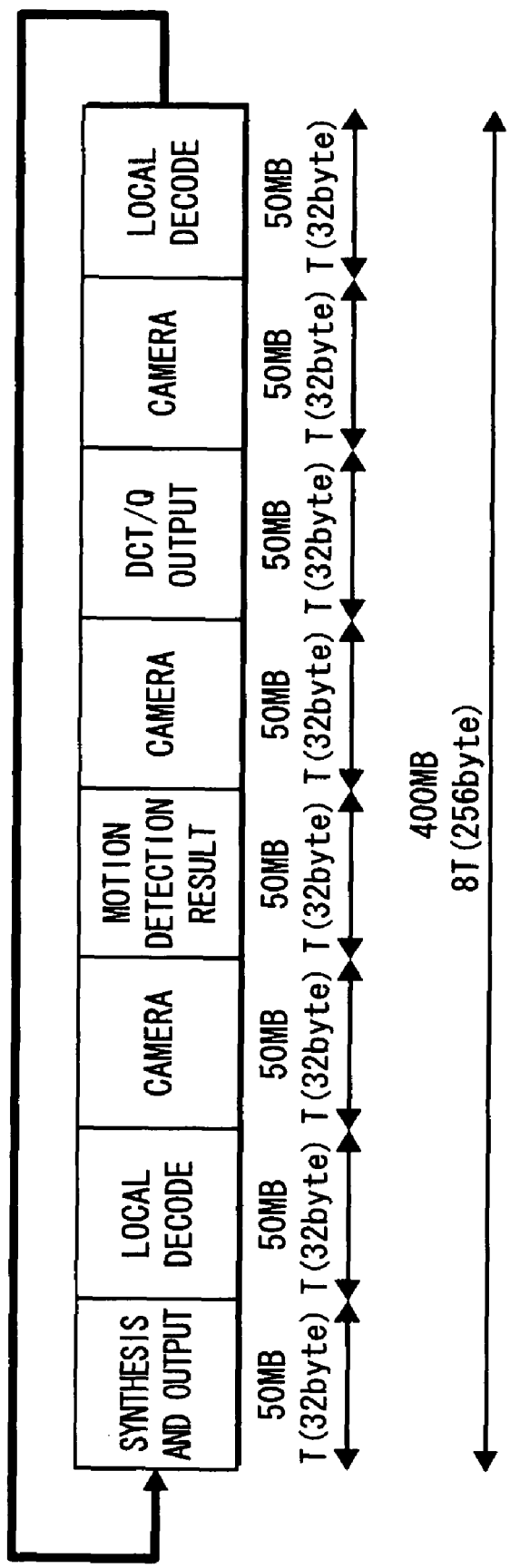
FIG. 10 is an example of a protocol and bandwidth allocation of a signal that is input/output via a data I/O port 113.

FIG. 10 shows an example of a protocol and bandwidth allocation of a signal that is to be input/output via the data I/O port 113.

Assuming that the buses 108 to 110 operate at 100 MHz and the width in bits is 32 bits, it is possible to secure a bandwidth of 400 MB/s. The example illustrated in FIG. 10 shows that pieces of data output from the cameras 100A to 100D are multiplexed by the time-division system, and sequentially and repeatedly output.

In this case, the cameras 100A to 100D are structured to operate at around 120 MHz, and the image processing unit 102 is structured to realize a data processing speed at around 480 MB/s. With this structure, the cameras 100A to 100D are capable of reading data from the imaging unit 101 at 80 MB/s, and reading data via the data I/O port 113 at 400 MB/s.

As described above, each of the cameras 100A to 100D is capable of singly encoding and outputting images captured by the imaging unit 101.

Also, if the cameras 100A to 100D are combined together, these cameras cooperate to synthesize images captured by the respective cameras, and encode and output the synthesized image.

Since one of the cameras 100A to 100D that is configured as the master camera synthesizes the images, the image quality at the borders of the images is not deteriorated.

If the image processing unit 102 has only a capacity of processing an image captured by the image processing unit 101 (approx. 1 mega pixels) on the assumption that the camera is used a stand-alone camera, it has conventionally been a great load on the image processing unit 161 to encode a synthesized image including as many as four times the pixels included in the image captured by the image processing unit 101 (4 mega pixels). However, since the encoding processing on the synthesized image is shared among the cameras configured as the slave cameras, it is possible to reduce the load on the image processing unit 102 of each of the plurality of the slave cameras.

The camera 100 configured as the master camera manages the IDs and the positions of the slave cameras, and generates a synthesized image based on the positional relation with respect to the slave cameras. Accordingly, the cameras 100 can be flexibly combined together to acquire a high-resolution image, and generate and encode an appropriate synthesized image in accordance with the combination.

MODIFICATION EXAMPLES

Various modifications may be applied to the camera 100 described above.

Modification Example 1

1. Overview

The cameras 100 pertaining to the embodiment 1 have a structure for sharing a plurality of processing procedures (the motion detection processing, the DCT/Q processing, the VLC processing, and the local decode processing) when combined and configured as the slave camera. However, the cameras 100 may be structured to share slices of an image.

2. Slice

Figure 11:
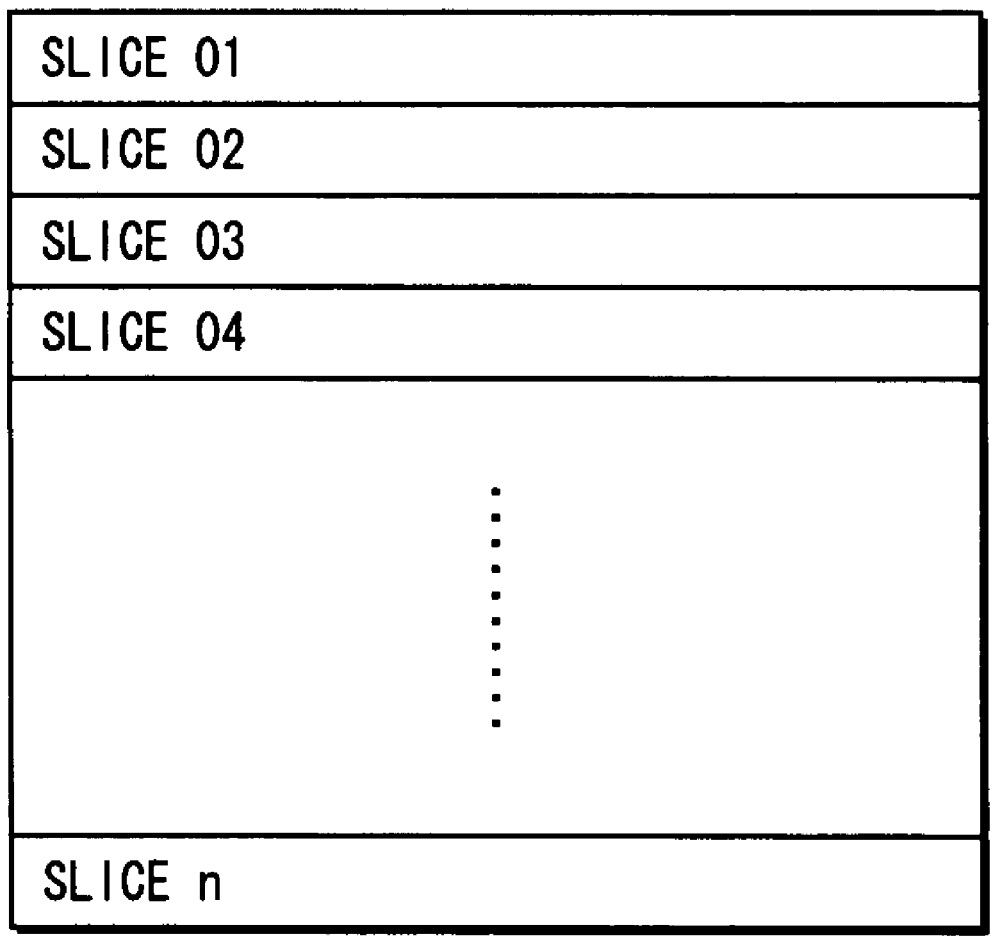
FIG. 11 shows slices in conformity with the MPEG standard.

FIG. 11 shows slices in conformity with the MPEG standard.

As FIG. 11 illustrates, an image (picture) encoded in conformity with the MPEG standard can be divided into a plurality of slices (slice 01, slice 02, slice 03, slice 04 . . . slice n).

3. Structure and Operations

Figure 12:
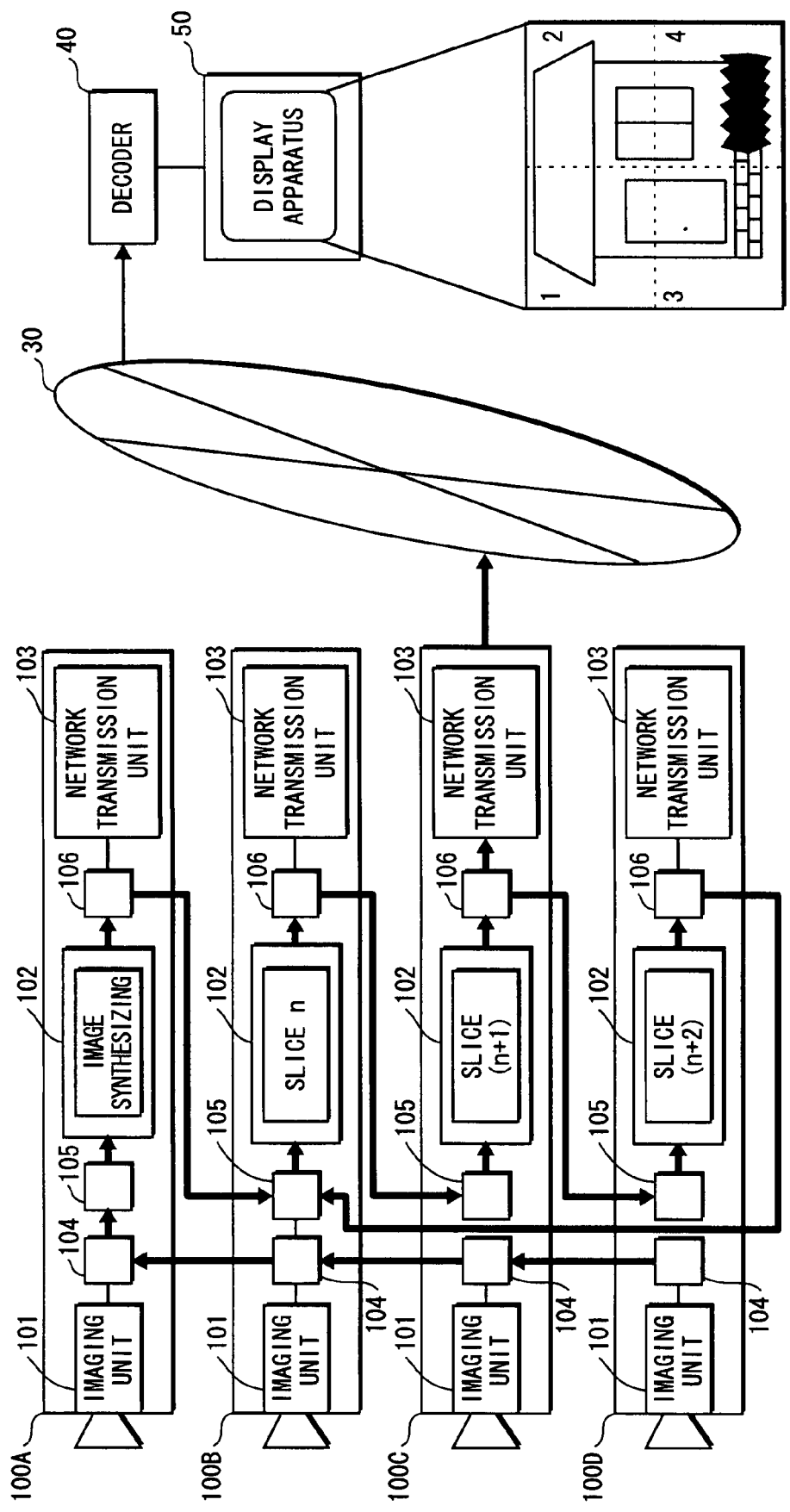
FIG. 12 shows a case where a plurality of cameras 100 of a modification example 1 are combined and cooperate.

FIG. 12 shows operations performed by the cameras pertaining to the modification example 1 that are combined to cooperate.

It is assumed that the camera 100A is configured as the master camera, and the cameras 100B to 100D are configured as the slave cameras.

In the modification example 1, in the case where the cameras 100 are combined for cooperation and the camera 100A is configured as the master camera, the image processing unit 102 of the camera 100A refers to the table and outputs signals for designating slices to be processed by the cameras 100B to 100D via the data I/O port 113, in accordance with the number of the cameras 100B to 100D.

Also, in the modification example 1, in the case where the plurality of the cameras 100 are combined for cooperation and the cameras 100B to 100D are configured as the slave cameras, each slave camera encodes a slice of the synthesized image received from the data I/O port 113 in accordance with the instruction received from the maser camera 100A.

In the example illustrated in FIG. 12, the number of cameras configured as the slave cameras is 3 (cameras 100B to 100D), and the camera 100A instructs the cameras 100B, 100C and 100D to encode the slice n, the slice (n+1) and the slice (n+2) respectively.

On reception of this instruction, the camera 100B encodes the slice n, the camera 100C encodes the slice (n+1), and the camera 100D encodes the slice (n+2).

With the stated structure, when combined together, the cameras 100A to 100D cooperate to share the encoding of the synthesized image in units of the slices and output the encoded slices.

Modification Example 2

1. Overview

The cameras 100 pertaining to the embodiment 1 have a structure in which the memory 102b stores therein a program to be executed by the reconfigurable logic circuit 102a when a plurality of the cameras 100 are combined.

However, the camera 100 may be structured to acquire a program from an external server via the IP network 30 such that the reconfigurable logic circuit 102a executes the program to perform part of the encoding processing when a plurality of the cameras 100 are combined.

2. Structure and Operations

Figure 13:
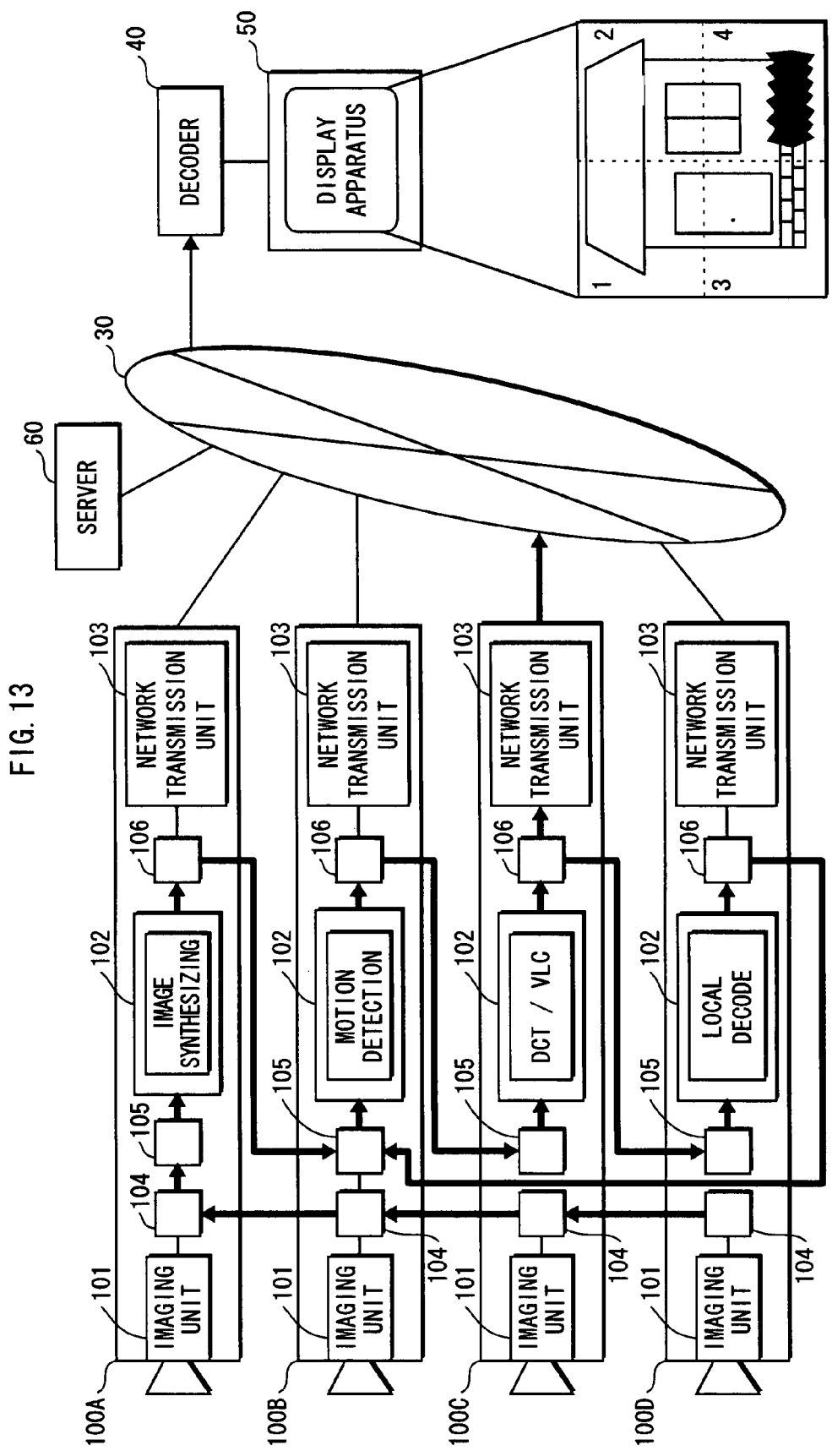
FIG. 13 shows a case where a plurality of cameras 100 of a modification example 2 are combined and cooperate.

FIG. 13 shows operations performed by the cameras 100 pertaining to the modification example 2 that are combined and cooperate.

It is assumed that the camera 100A is configured as the master camera, and the cameras 100B to 100D are configured as the slave cameras.

As FIG. 13 illustrates, a server 60 is connected to the IP network 30.

In the modification example 2, in the case where the camera 100 operates as a stand-alone camera, the memory 102b of the image processing unit 102 prestores only a program for encoding an image captured by the imaging unit 101.

In the modification example 2, in the case where the cameras 100 are combined for cooperation and the camera 100A is configured as the master camera, the image processing unit 102 of the camera 100A refers to the table and outputs signals for indicating encoding processing to be executed by the cameras 100B to 100D via the data I/O port 113, in accordance with the number of the cameras 100B to 100D configured as the slave cameras.

In the modification example 2, in the case where the cameras 100 are combined for cooperation, the image processing unit 301 of each of the cameras 100B to 100D acquires a program for encoding processing to be executed on the synthesized image, which has been received from the data I/O port 113, from the server 60, and loads the program into the memory 102b. The reconfigurable logic circuit 102a executes the program loaded into the memory 102b to change the circuit configuration, and executes the encoding processing allocated thereto.

In the example shown in FIG. 13, the camera 100A instructs the camera 100B, the camera C and the camera D to perform the motion detection processing, the DCT/Q processing and the VLC processing, and the local decode processing respectively.

The camera 100B acquires a program for performing the motion detection processing from the server 60, and loads the program into the memory 102b. The reconfigurable logic circuit 102a executes the loaded program.

The camera 100C acquires a program for performing the DCT/Q processing and the VLC processing from the server 60, and loads the program into the memory 102b. The reconfigurable logic circuit 102a executes the loaded program.

The camera 100C acquires a program for performing the local decode processing from the server 60, and loads the program into the memory 102b. There configurable logic circuit 102a executes the loaded program.

With the stated structure, it is unnecessary for the camera 100 to prestore programs for encoding the synthesized image in the memory 102b. The camera 100 can acquire a minimum program from the server 60 according to need, and execute the program.

This structure is particularly useful in the case where the number of cameras to be combined has not been predetermined, because different encoding processing is allocated to each of the slave cameras by the master camera 100A depending on the number of cameras 100 to be combined.

Modification Example 3

1. Overview

The camera 100 pertaining to the embodiment 1 may include a drive unit 115 to drive a lens.

2. Structure

Figure 14:
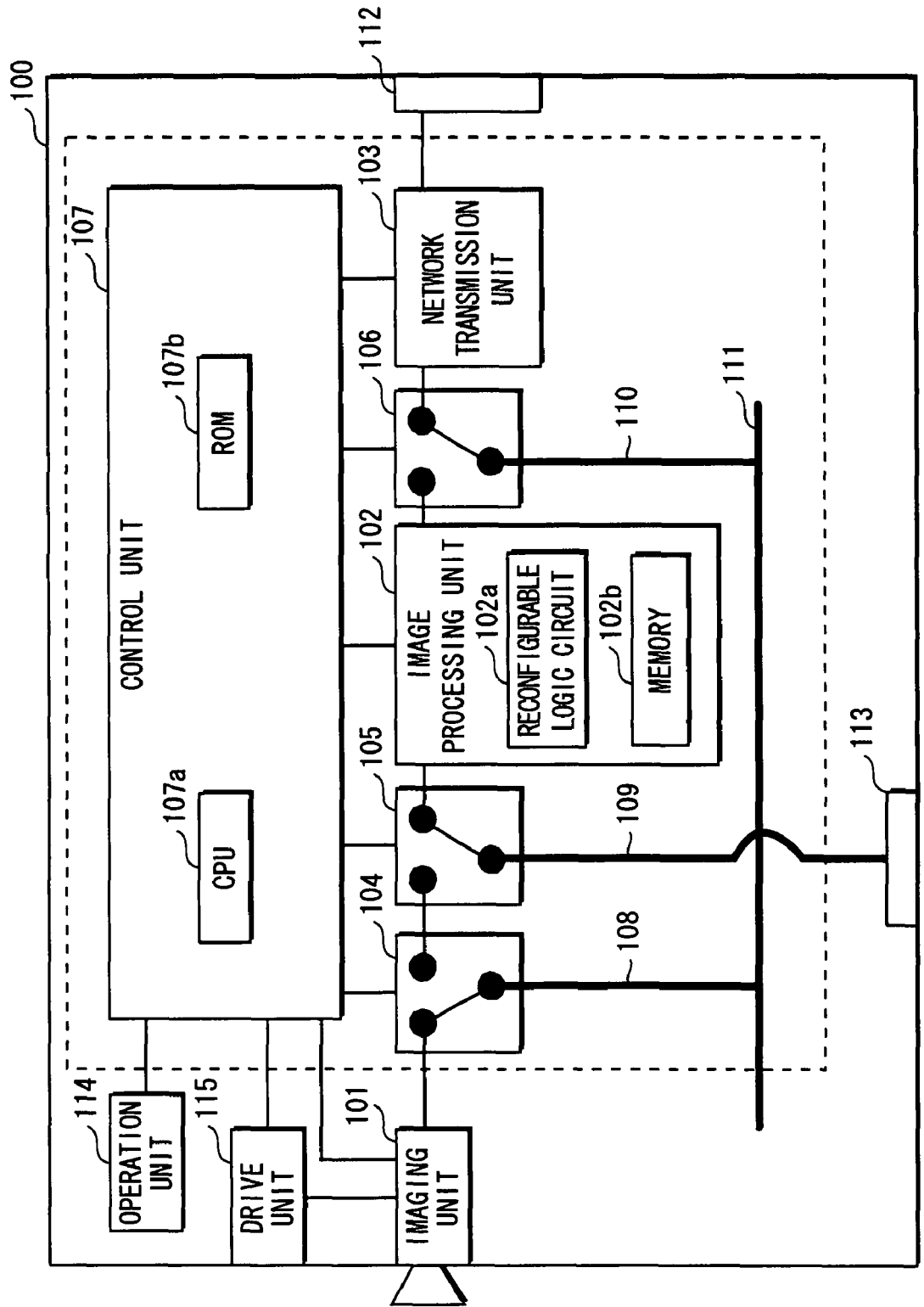
FIG. 14 is a block diagram showing the structure of a camera 100 of a modification example 3.

FIG. 14 is a block diagram showing the structure of the camera 100 pertaining to the modification example 3.

The drive unit 115 has a function to adjust the lens of the imaging unit 101 in accordance with an instruction from the control unit 107.

Accordingly, the camera 100 is capable of adjusting the lens of the camera 100 in accordance with an instruction from the operation unit 114 for example, to perform zoom, pan (horizontal movement of the lens), tilt (vertical movement of the lens), and so on.

In the modification example 3, in the case where the cameras 100 are combined, when the lens of the imaging unit 101 of any one of the cameras (e.g. the camera 100A) is adjusted, the camera 100A accordingly outputs a signal for giving an instruction to adjust the lens to each of the other cameras (e.g. the cameras 100B to 100D) via the data I/O port 113.

Each of the cameras 100B to 100D adjusts the lens of the imaging unit 101 thereof by the drive unit 115, in accordance with the instruction received from the camera 100A.

Specifically, the degree of the overlap of edges of the images captured by the cameras 100A to 100D changes in accordance with the adjustment of the lens of the imaging unit 101 included in the camera 100A. Accordingly, the camera 100A instructs each of the cameras 100B to 100D to adjust the lens of the imaging unit 101 such that the degree of the overlap is in the same range as that in the pre-adjustment status.

For example, when the camera 100A zooms by adjusting the lens of the imaging unit 101 thereof, each of the cameras 100B to 100D is also required to zoom by adjusting the lens thereof. At the same time, each of the cameras 100B to 100D is required to perform the pan and the tilt such that the degree of the overlap is in the same range as that in the pre-adjustment status.

With the stated structure, in the case where the cameras 100A to 100D are combined, when any of the cameras (e.g. the camera 100A) adjusts the imaging unit 101 to perform the zoom, the pan and the tilt, each of the other cameras (e.g. the cameras 100B to 100D) also adjusts the imaging unit 101 thereof so that the border of the synthesized images can be located appropriately.

Modification Example 4

1. Overview

The camera 100 pertaining to the embodiment 1 has a structure for transmitting the image encoded by the image processing unit 102 to the IP network 30 via the network transmission unit 103.

However, the camera 100 may be structured without the network transmission unit 103, and the reconfigurable logic circuit 102a included in the image processing unit 102 may change the circuit configuration thereof to perform the same processing as the network transmission unit 103.

Figure 15:
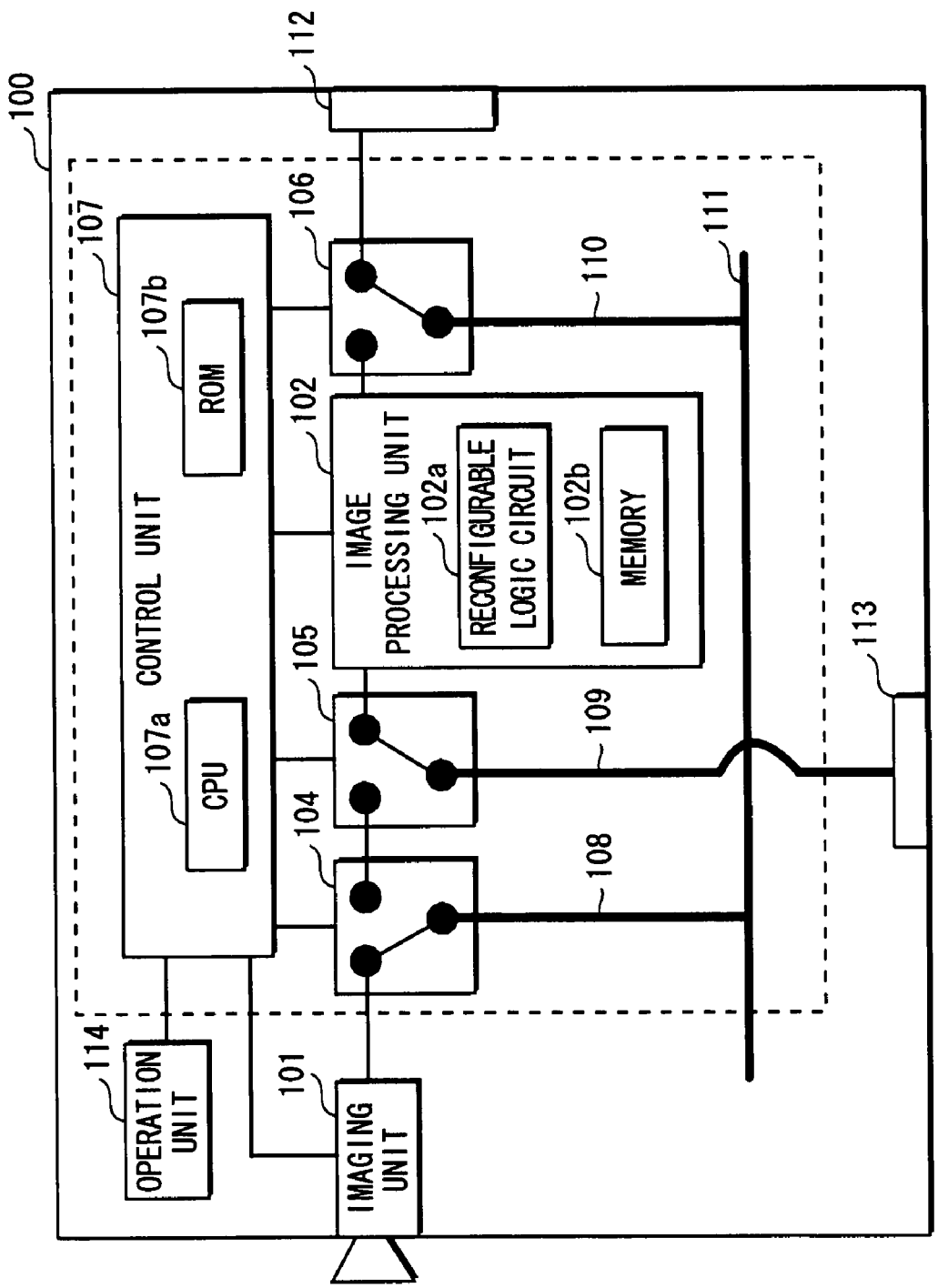
FIG. 15 is a block diagram showing the structure of a camera 100 of a modification example 4.

FIG. 15 is a block diagram showing the structure of the camera 100 pertaining to the modification example 4.

In the modification example 4, the memory 102b stores therein a program for executing processing performed by the network transmission unit 103 (transmitting the data image-processed by the image processing unit 102 to the external IP network via the net work port 112). The reconfigurable logic circuit 102a executes the program to transmit the image processed by the image processing unit 102 to the IP network 30 via the network port 112.

With the stated structure, it is possible to simplify the structure of the camera 100. This is effective for miniaturization of the camera 100.

Modification Example 5

1. Overview

The camera 100 pertaining to the embodiment 1 has a structure with which the camera 100 operates as a stand-alone camera when not combined with other cameras 100, and cooperate with other cameras 100 when combined together.

However, the camera 100 may be structured such that the decoder 40 instructs the camera 100 whether to operate stand-alone or cooperate with other cameras 100.

Figure 16A:
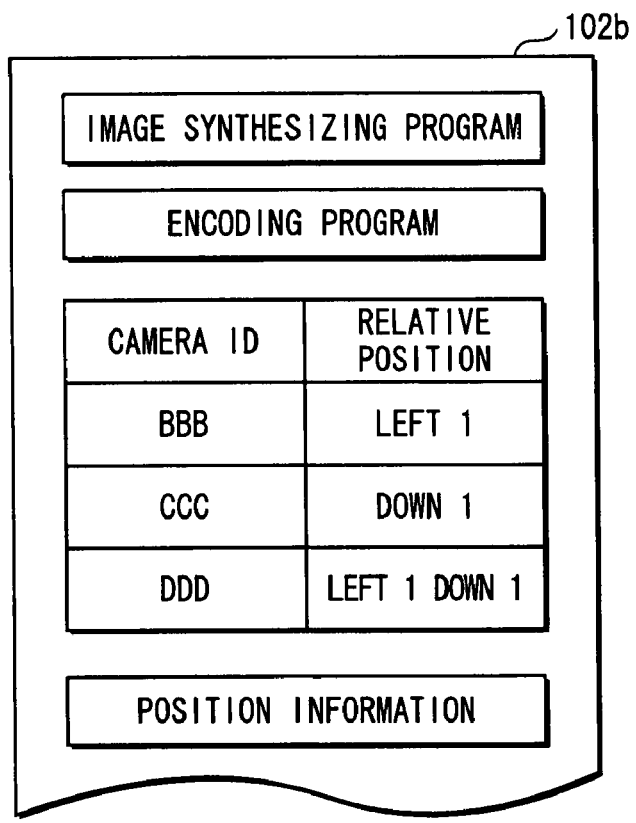
FIGS. 16A and 16B schematically show data to be stored in a memory 102b of a modification example 5 and data to be stored in a ROM 107b of the modification example 5, respectively.
Figure 16B:
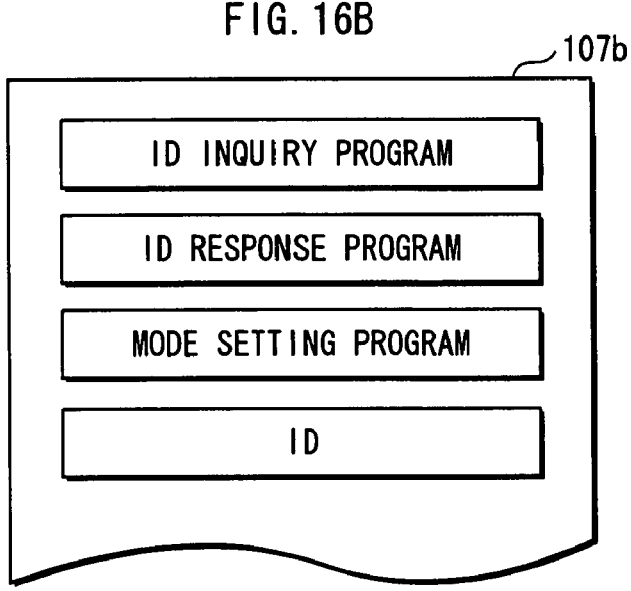
Figure 18:
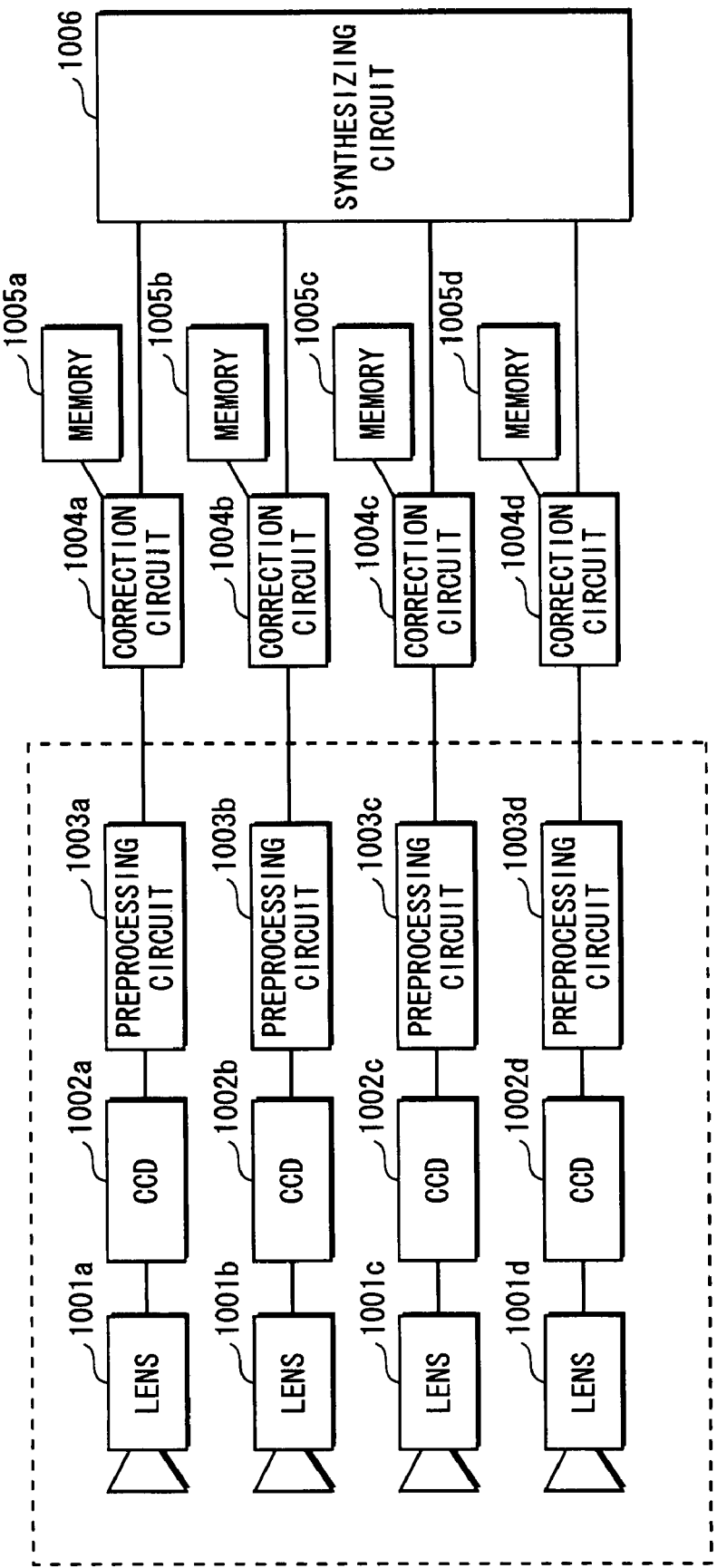
FIG. 18 is a block diagram showing the structure of a conventional camera.

FIGS. 16A and 16B schematically show data to be stored in a memory 102b of a modification example 5 and data to be stored in a ROM 107b of the modification example 5.

FIG. 17 shows a camera 100 of a modification example 5.

As FIGS. 16A and 16B illustrate, the ROM 107b of the modification example 5 stores therein a mode setting program.

The mode setting program has a function to perform mode setting on the image processing unit 102 in accordance with mode instruction information received from the decoder 40 via the network port 112.

As FIG. 17 illustrates, the decoder 40 includes a mode instruction unit 41.

The mode instruction unit 41 has a function to transmit information for instructing the camera 100 whether to operate in a mode for stand-alone operation or in a mode for cooperation, to the camera 100 via the IP network 30.

In the case of receiving an instruction to operate in the mode for operating stand-alone, the CPU unit 107a that executes the mode setting program instructs the image processing unit 102 to operate stand-alone (i.e. to operate as explained with reference to FIG. 6). In the case of receiving an instruction to operate in the mode for cooperation, the CPU unit 107a instructs the image processing unit 102 to cooperate with the other cameras 100 (i.e. to operate as explained with reference to FIG. 7).

With the structure described above, it is possible for the decoder 40 to determine whether the camera 100 is to operate stand-alone or cooperate with the other cameras 100. This is useful because the operator of the decoder 40 can switch between the stand-alone mode and the cooperation mode of the camera 100 depending on the image to be monitored.

Supplemental Explanations

The camera system of the present invention is described above based on the embodiment 1 and the modification examples 1 to 5. However, the present invention is not limited to the descriptions above.

(1) The embodiment 1 and the modification examples 1 to 5 each show an example where the position information of the camera 100 to be configured as a slave camera is input from the operation unit 114 as a combination of the characters "up", "down", "left" and "right" and numbers. However, the present invention is not limited to this.

Any method may be used as long as it is possible to recognize the relative position with respect to the camera 100 as the master camera. For example, a connection detection sensor may be provided in the connectors 10 at all the sides, and the relative positions of the cameras other than the master camera may be input in accordance with the position of the connection detection sensors that detect connection. Also, the relative positions of the cameras other than the master camera may be recognized by performing pattern-matching of the pixels at the edges (rims) of the captured images.

(2) The embodiment 1 and the modification examples 1 to 5 each show an example where the position information "0" is input from the operation unit 114 to configure the camera 100 as the master camera. However, the present invention is not limited to this.

For example, a switch may be provided in addition to the operation unit 114, and the instruction for selecting the master or the slave may be input from the switch.

(3) The embodiment 1 and the modification examples 1 to 5 each show an example where the cameras 100 are connected with use of the connectors 10 and the connecting members 20. However, the present invention is not limited to this. Any method may be used as long as it is possible to connect the cameras 100 to each other.

(4) The embodiment 1 and the modification examples 1 to 5 each show an example where the imaging unit 101 offers 0.1 mega×0.1 mega pixels. However, the present invention is not limited to this. The number of the pixels is arbitrary. The number can be variously changed, e.g. 0.3 mega×0.2 mega pixels.

(5) The embodiment 1 and the modification examples 1 to 5 each show an example where four cameras, namely the cameras 100A to 100D, are combined together. However, the number of the cameras is not limited to this.

The camera 100 can be combined with an arbitrary number of cameras via the connectors 10, and can be connected to an arbitrary number of cameras via the data I/O port 113.

(6) The embodiment 1 and the modification examples 1 to 5 each show an example where the cameras 100 are connected by FPCs or cables via the data I/O port 113. However, the present invention is not limited to this.

Wireless technologies, such as the UWB (Ultra Wide Band) and the Bluetooth™ may be used for the connection. Also, an electrode may be provided in each connector 10, and the cameras 100 may be connected via the electrodes. The cameras 100 may be connected in any manner as long as it is possible to transmit data.

(7) The embodiment 1 and the modification examples 1 to 5 each show the structure in which the reconfigurable logic circuit 102a (e.g. FPGA) is used such that the processing performed by the image processing unit 102 can be changed in terms of functions of hardware. However, the present invention is not limited to this.

For example, a processor for image processing may be provided in the image processing unit 102, and the processor may execute program for generation of a synthesized image and encoding of the synthesized image to change the processing performed by the image processing unit 102 in terms of functions of software.

(8) In the embodiment 1 and the modification examples 1, 2, 3 and 5, the image processing unit 102, the network transmission unit 103, the camera output data selector 104, the image processing input data selector 106, the control unit 107, the buses 108, 109 and 110, and the bus selector 111 may be integrated onto a single chip as FIG. 4 and FIG. 14 illustrate. In the same manner, in the modification example 4, the image processing unit 102, the camera output data selector 104, the image processing input data selector 105, the image processing output data selector 106, the control unit 107, the buses 108, 109 and 110 and the bus selector 111 may be integrated onto a single chip as FIG. 15 illustrates. The single chip circuit may be variously described as an IC (Integrated Circuit), an LSI (Large Scale Integration), a VLSI (Very Large Scale Integration), a ULSI (Ultra-Large Scale Integration), and so on depending on the extent of integration.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A camera system that includes a plurality of cameras including at least a first camera and a second camera,
each of the plurality of cameras comprising:
an imaging unit; and
an image processing unit operable, if configured to operate in a first mode that is for stand-alone operation, to perform encoding processing on an image captured by the imaging unit,
the first camera further comprising:
an image receiving unit operable to receive images from other cameras among the plurality of cameras;
a first execution unit operable, if configured to operate in a second mode that is for cooperation with said other cameras, to cause the image processing unit of the first camera to generate a synthesized image by synthesizing the images received by the image receiving unit and an image captured by the imaging unit of the first camera; and
a synthesized image transmission unit operable to transmit the synthesized image to the second camera, and
the second camera further comprising:
a synthesized image receiving unit operable to receive the synthesized image from the first camera; and
a second execution unit operable, if configured to operate in the second mode, to cause the image processing unit of the second camera to perform part or whole of the encoding processing on the synthesized image received by the synthesized image receiving unit.

2. The camera system of claim 1, wherein
the image processing unit of the first camera and the image processing unit of the second camera include the first execution unit and the second execution unit respectively,
the first execution unit and the second execution unit are reconfigurable circuits, each being capable of changing a circuit structure thereof to perform different processing,
when configured to operate in the second mode, the first execution unit changes the circuit structure thereof to generate the synthesized image, and
when configured to operate in the second mode, the second execution unit changes the circuit structure thereof to perform part or whole of the encoding processing on the synthesized image.

3. The camera system of claim 1, wherein
the first camera further comprises a camera information receiving unit operable, if configured to operate in the second mode, to receive, from each of said other cameras, an identifier thereof and position information that indicates a relative position thereof with respect to the first camera, and if configured to operate in the second mode, the image processing unit of the first camera generates the synthesized image based on the identifier and the position information of each of said other cameras received by the camera information receiving unit.

4. The camera system of claim 1, wherein if configured to operate in the second mode, the second camera performs part of the encoding processing on the synthesized image, using the image processing unit thereof, and among the plurality of cameras, one or more cameras different from the first and the second cameras share the rest of the encoding processing to be performed on the synthesized image.

5. The camera system of claim 4, wherein if configured to operate in the second mode, the first camera instructs said other cameras to share the encoding processing to be performed on the synthesized image, and if configured to operate in the second mode, the second, camera and said one or more cameras different from the first and the second cameras share the encoding processing to be performed on the synthesized image.

6. The camera system of claim 4, wherein the encoding processing performed on the synthesized image includes a plurality of processing procedures, and if configured to operate in the second mode, the second camera and said one or more cameras different from the first and the second cameras share the plurality of processing procedures, using the image processing unit of each.

7. The camera system of claim 4, wherein the synthesized image is encodable in units of slices in conformity with the MPEG standard, and if configured to operate in the second mode, the second camera and said one or more cameras different from the first and the second cameras share the slices to perform the encoding processing, using the image processing unit of each.

8. The camera system of claim 1 further including an external apparatus connected to the plurality of cameras via a network, the external apparatus comprising an instruction unit operable to give an instruction to each of the plurality of cameras to operate in the first mode or the second mode, wherein each of the plurality of cameras determines which mode to operate in between the first mode and the second mode in accordance with the instruction given by the external apparatus.

9. A camera that is capable of cooperating with a plurality of other cameras, comprising:

an imaging unit;

an image processing unit operable, if configured to operate in a first mode that is for stand-alone operation, to perform encoding processing on an image captured by the imaging unit;

an image receiving unit operable, if configured to operate in a second mode that is for cooperation with other cameras, to receive images from said other cameras;

an execution unit operable, if configured to operate in the second mode, to cause the image processing unit to generate a synthesized image by synthesizing the images received by the image receiving unit and an image captured by the imaging unit; and a transmission unit operable to transmit the generated synthesized image and an instruction for performing the encoding processing on the synthesized image to at least one of said other cameras.

10. A camera that is capable of cooperating with a plurality of other cameras, comprising:

an imaging unit;

an image processing unit operable, if configured to operate in a first mode that is for stand-alone operation, to perform encoding processing on an image captured by the imaging unit;

an image transmission unit operable, if configured to operate in a second mode that is for cooperation with other cameras, to transmit an image captured by the imaging unit to one of the plurality of other cameras; and a synthesized image receiving unit operable, if configured to operate in the second mode, to receive, from the first camera, a synthesized image generated by synthesizing the image captured by the imaging unit and other images; and an execution unit operable, if configured to operate in the second mode, to cause the image processing unit to perform part or whole of the encoding processing on the synthesized image received by the synthesized image receiving unit.

11. An image processing circuit that is usable in a camera and capable of cooperating with other image processing circuits, the image processing circuit comprising:

an image processing unit operable, if configured to operate in a first mode that is for stand-alone operation, to perform encoding processing on an image captured by an imaging unit of a camera;

an image receiving unit operable, if configured to operate in a second mode that is for cooperation with said other image processing circuits, to receive images from said other image processing circuits;

an execution unit operable, if configured to operate in the second mode, to cause the image processing unit of the camera to generate a synthesized image by synthesizing the images received by the image receiving unit and an image captured by the imaging unit; and a transmission unit operable to transmit the generated synthesized image and an instruction for performing the encoding processing on the synthesized image to at least one of said other image processing circuits.

12. An image processing circuit that is usable in a camera and capable of cooperating with a plurality of other image processing circuits, the image processing circuit comprising:

an image processing unit operable, if configured to operate in a first mode that is for stand-alone operation, to perform encoding processing on an image captured by an imaging unit of a camera;

an image transmission unit operable, if configured to operate in a second mode that is for cooperation with said other image processing circuits, to transmit an image captured by the imaging unit to one of the plurality of other image processing circuits; and a synthesized image receiving unit operable, if configured to operate in the second mode, to receive, from the one of the plurality of other image processing circuits, a synthesized image generated by synthesizing the image captured by the imaging unit and other images; and an execution unit operable, if configured to operate in the second mode, to cause the image processing unit to perform part or whole of the encoding processing on the synthesized image received by the synthesized image receiving unit.

* * * * *